US010100582B2

(12) United States Patent
Cox

(10) Patent No.: US 10,100,582 B2
(45) Date of Patent: Oct. 16, 2018

(54) ROTATIONAL DRILL BITS AND DRILLING APPARATUSES INCLUDING THE SAME

(71) Applicant: Dover BMCS Acquisition Corporation, Orem, UT (US)

(72) Inventor: E. Sean Cox, Spanish Fork, UT (US)

(73) Assignee: DOVER BMCS ACQUISITION CORPORATION, Orem, UT (US)

( * ) Notice: Subject to any disclaimer, the term of this patent is extended or adjusted under 35 U.S.C. 154(b) by 420 days.

(21) Appl. No.: 14/806,157

(22) Filed: Jul. 22, 2015

(65) Prior Publication Data

US 2015/0322728 A1 Nov. 12, 2015

Related U.S. Application Data

(63) Continuation of application No. 13/678,105, filed on Nov. 15, 2012, now Pat. No. 9,109,412, which is a continuation-in-part of application No. 12/794,569, filed on Jun. 4, 2010, now Pat. No. 8,584,777.

(51) Int. Cl.
*E21B 10/60* (2006.01)
*B23P 15/32* (2006.01)
*E21B 10/55* (2006.01)
*B23P 15/28* (2006.01)
*E21B 10/567* (2006.01)
*E21B 10/54* (2006.01)

(52) U.S. Cl.
CPC .............. *E21B 10/55* (2013.01); *B23P 15/28* (2013.01); *E21B 10/54* (2013.01); *E21B 10/5673* (2013.01); *E21B 10/602* (2013.01)

(58) Field of Classification Search
CPC ......... B23B 51/02; B23B 51/06; B23P 15/32; E21B 10/44; E21B 10/60
See application file for complete search history.

(56) References Cited

U.S. PATENT DOCUMENTS

| 1,288,893 A | 12/1918 | Holmes |
| 1,943,880 A | 1/1934 | Brady |
| 2,578,593 A | 12/1951 | Phipps |

(Continued)

OTHER PUBLICATIONS

European Search Report dated Nov. 5, 2015 in corresponding European Application No. 13193101.6 filed in EPO Nov. 15, 2013.

(Continued)

*Primary Examiner* — Kenneth L Thompson
(74) *Attorney, Agent, or Firm* — FisherBroyles, LLP

(57) ABSTRACT

A method for manufacturing a roof-bolt drill bit includes providing a bit body rotatable about a rotational axis, the bit body having at least two cutting element support structures, each of the at least two cutting element support structures including a mounting surface for mounting a cutting element to the bit body and a trailing support surface. The method includes forming an internal passage within the bit body, the internal passage extending from a rearward opening defined in the rearward end of the bit body through at least a portion of the bit body, and forming a fluid port within each of the at least two cutting element support structures, each fluid port extending from the internal passage to a port opening defined in the corresponding cutting element support structure, each port opening being positioned adjacent to the mounting surface of the corresponding cutting element support structure.

19 Claims, 17 Drawing Sheets

(56) References Cited

U.S. PATENT DOCUMENTS

| | | |
|---|---|---|
| 2,802,642 A | 8/1957 | Feucht |
| 3,163,246 A | 12/1964 | Vagins et al. |
| 3,434,553 A | 3/1969 | Weller |
| 4,189,013 A | 2/1980 | Adams et al. |
| 4,190,125 A | 2/1980 | Emmerich et al. |
| 4,190,128 A | 2/1980 | Emmerich |
| 4,216,832 A | 8/1980 | Stephenson et al. |
| 4,330,044 A | 5/1982 | Orr et al. |
| 4,350,215 A | 9/1982 | Radtke |
| 4,352,400 A | 10/1982 | Grappendorf et al. |
| 4,368,789 A | 1/1983 | Orr et al. |
| 4,446,936 A | 5/1984 | Sarin et al. |
| 4,488,609 A | 12/1984 | Sarin |
| 4,492,278 A | 1/1985 | Leighton |
| 4,515,230 A | 5/1985 | Means et al. |
| 4,527,931 A | 7/1985 | Sarin |
| 4,550,791 A | 11/1985 | Isakov |
| 4,605,079 A | 8/1986 | Leibee et al. |
| 4,712,626 A | 12/1987 | Shaw |
| 4,794,994 A | 1/1989 | Deane et al. |
| 4,848,489 A | 7/1989 | Deane |
| 4,848,491 A | 7/1989 | Burridge et al. |
| 4,883,132 A | 11/1989 | Tibbitts |
| 4,887,677 A | 12/1989 | Warren et al. |
| 4,946,314 A | 8/1990 | Guber |
| 5,025,875 A | 6/1991 | Witt |
| 5,180,022 A | 1/1993 | Brady |
| 5,220,967 A | 6/1993 | Monyak |
| 5,287,937 A | 2/1994 | Sollami et al. |
| 5,301,763 A | 4/1994 | Peay et al. |
| 5,303,787 A | 4/1994 | Brady |
| 5,400,861 A | 3/1995 | Sheirer |
| 5,429,199 A | 7/1995 | Sheirer et al. |
| 5,443,565 A | 8/1995 | Strange, Jr. |
| 5,447,208 A | 9/1995 | Lund et al. |
| 5,452,628 A | 9/1995 | Montgomery, Jr. et al. |
| 5,458,210 A | 10/1995 | Sollami |
| 5,509,761 A * | 4/1996 | Grossman ........... B23B 51/0493 408/223 |
| 5,699,868 A | 12/1997 | Caraway et al. |
| 5,800,100 A * | 9/1998 | Krenzer ................ B23B 27/145 407/113 |
| 5,967,247 A | 10/1999 | Pessier |
| 5,996,714 A | 12/1999 | Massa et al. |
| 6,021,858 A | 2/2000 | Southland |
| 6,062,325 A | 5/2000 | Taylor et al. |
| 6,109,377 A | 8/2000 | Massa et al. |
| 6,123,160 A | 9/2000 | Tibbitts |
| 6,125,947 A | 10/2000 | Trujillo et al. |
| 6,145,606 A | 11/2000 | Haga |
| 6,193,722 B1 | 2/2001 | Zech et al. |
| 6,302,223 B1 | 10/2001 | Sinor |
| 6,321,862 B1 | 11/2001 | Beuershausen et al. |
| 6,595,305 B1 | 7/2003 | Dunn et al. |
| 6,684,968 B2 | 2/2004 | Bise et al. |
| 6,834,733 B2 | 12/2004 | Maouche et al. |
| 6,915,867 B2 | 7/2005 | Bise |
| 8,584,777 B2 | 11/2013 | Cox et al. |
| 9,109,412 B2 | 8/2015 | Cox |
| 9,371,701 B2 * | 6/2016 | Cox .................... E21B 10/5673 |
| 2004/0028491 A1 * | 2/2004 | Fritsch ................ B23B 51/0493 408/227 |
| 2007/0119624 A1 | 5/2007 | Brady |
| 2009/0220309 A1 | 9/2009 | Weaver et al. |
| 2011/0297451 A1 * | 12/2011 | Cox .................... E21B 10/5673 175/428 |

OTHER PUBLICATIONS

International Search Report and Written Opinion received in PCT Application No. PCT/US11/39139 dated Oct. 13, 2011.

* cited by examiner

ROTATIONAL DRILL BITS AND DRILLING APPARATUSES INCLUDING THE SAME

CROSS REFERENCE TO RELATED APPLICATION

This application is a continuation of U.S. application Ser. No. 13/678,105, filed 15 Nov. 2012, which is a continuation in part of U.S. application Ser. No. 12/794,569, filed 4 Jun. 2010, each of which is hereby incorporated by reference in its entirety.

BACKGROUND

Cutting elements are traditionally utilized for a variety of material removal processes, such as machining, cutting, and drilling. For example, tungsten carbide cutting elements have been used for machining metals and on drilling tools for drilling subterranean formations. Similarly, polycrystalline diamond compact (PDC) cutters have been used to machine metals (e.g., non-ferrous metals) and on subterranean drilling tools, such as drill bits, reamers, core bits, and other drilling tools. Other types of cutting elements, such as ceramic (e.g., cubic boron nitride, silicon carbide, and the like) cutting elements or cutting elements formed of other materials have also been utilized for cutting operations.

Drill bit bodies to which cutting elements are attached are often formed of steel or of molded tungsten carbide. Drill bit bodies formed of molded tungsten carbide (so-called matrix-type bit bodies) are typically fabricated by preparing a mold that embodies the inverse of the desired topographic features of the drill bit body to be formed. Tungsten carbide particles are then placed into the mold and a binder material, such as a metal including copper and tin, is melted or infiltrated into the tungsten carbide particles and solidified to form the drill bit body. Steel drill bit bodies, on the other hand, are typically fabricated by machining a piece of steel to form the desired external topographic features of the drill bit body.

In some situations, drill bits employing cutting elements may be used in subterranean mining to drill roof-support holes. For example, in underground mining operations, such as coal mining, tunnels must be formed underground. In order to make the tunnels safe for use, the roofs of the tunnels must be supported in order to reduce the chances of a roof cave-in and/or to block various debris falling from the roof. In order to support a roof in a mine tunnel, boreholes are typically drilled into the roof using a drilling apparatus. The drilling apparatus commonly includes a drill bit attached to a drilling rod (such as a drill steel). Roof bolts are then inserted into the boreholes to anchor a support panel to the roof. The drilled boreholes may be filled with resin prior to inserting the bolts, or the bolts may have self expanding portions, in order to anchor the bolts to the roof.

Various types of cutting elements, such as PDC cutters, have been employed for drilling boreholes for roof bolts. Although other configurations are known in the art, PDC cutters often comprise a substantially cylindrical or semi-cylindrical diamond "table" formed on and bonded under high-pressure and high-temperature (HPHT) conditions to a supporting substrate, such as a cemented tungsten carbide (WC) substrate.

During drilling operations, heat may be generated in the cutting elements due to friction between the cutting elements and a subterranean formation being drilled, causing the drilling equipment to become worn or damaged. Additionally, a significant amount of debris is generated as rock material is fractured and cut away from the subterranean formation by the cutting elements, slowing the drilling process and causing the drilling equipment to become worn or damaged. In order to cool the cutting elements and clear debris away from the cutting area during drilling, a drilling fluid such as drilling mud or air may be pumped into a borehole being drilled. In some examples, the drilling fluid may be pumped through a hole in the drill bit to a fluid port near the cutting elements. In other embodiments, a vacuum may be used to draw material away from the cutting region and to cool the cutting elements.

Ports within drill bits for dispensing drilling fluids may become clogged with debris, such as rock chips, during drilling operations, potentially preventing the drilling fluid from effectively removing debris and cooling the cutting surfaces. Additionally, vacuum ports may become clogged or may lose suction during drilling. For example, there may be insufficient annulus present in a borehole to maintain adequate air flow for removing debris from the cutting area, which may prevent outside air from effectively reaching the vacuum ports. Such problems may cause the drill bits to become worn and damaged due to a lack of adequate cooling and material removal, causing delays in drilling operations. Avoiding such delays may reduce unnecessary downtime and production losses, which may be particularly important during bolting operations in mine tunnels due to various safety hazards present in these environments.

SUMMARY

The instant disclosure is directed to exemplary roof-bolt drill bits. In some embodiments, a roof-bolt drill bit may comprise a bit body that is rotatable about a central axis and that comprises a forward end and a rearward end axially spaced away from the forward end. The bit body may comprise an internal passage defined within the bit body that extends from a rearward opening defined in the rearward end of the bit body through at least a portion of the bit body. A fluid port may extend from the internal passage to a port opening defined in the bit body. The drill bit may also comprise a cutting element coupled to the bit body, the cutting element including a cutting face, a cutting edge adjacent to the cutting face, and a trailing surface spaced away from the cutting face, the trailing surface being mounted to the bit body. The cutting element may comprise a superabrasive material, such as polycrystalline diamond, bonded to a substrate. The port opening may be positioned adjacent to the trailing surface of the cutting element.

According to at least one embodiment, the fluid port alignment may form an angle with respect to a forward direction of the central axis, such as an angle between about 10° and about 40°. Additionally, the port opening may be radially offset from the internal passage. A central passage may be defined within the bit body, the central passage extending from the internal passage to a forward opening defined in a forward portion of the bit body, and the forward opening may be located adjacent to the cutting element. In some embodiments, a debris channel may be defined in the bit body, the debris channel being configured to direct debris away from the cutting element. The debris channel may be located adjacent to the cutting face of the cutting element.

According to at least one embodiment, a drill bit may comprise a bit body rotatable about a central axis. The bit body may comprise a forward end, a rearward end axially spaced away from the forward end, and an internal passage defined within the bit body, the internal passage extending from a rearward opening defined in the rearward end of the bit body through at least a portion of the bit body. A fluid port may be defined within a portion of the bit body radially offset from the internal passage, the fluid port extending from the internal passage to a port opening defined in a side portion of the bit body. A cutting element may be coupled to the bit body. The fluid port may be configured to direct fluid from the port opening in a direction that forms an angle with respect to the forward direction of the central axis, such as an angle between about 0° to about 45° and/or an angle between about 5° to about 30° with respect to the forward direction of the central axis. Additionally, the fluid port may be configured to direct fluid away from the cutting element.

According to various embodiments, the drill bit may comprise a bit body rotatable about a central axis. The bit body may comprise a forward end, a rearward end axially spaced away from the forward end, and two cutting element support structures. Each of the two cutting element support structures may include a mounting surface. The drill bit may further comprise two cutting elements, each of the two cutting elements being mounted to a corresponding cutting element support structure of the two cutting element support structures. A trailing surface of each cutting element may be fixed to the mounting surface of the corresponding cutting element support structure. The bit body may also comprise an internal passage defined within the bit body, the internal passage extending from a rearward opening defined in the rearward end of the bit body through at least a portion of the bit body. The bit body may additionally include a fluid port defined within each of the two cutting element support structures, each of the fluid ports extending from the internal passage to a port opening that is disposed nearer to the trailing surface of one of the cutting elements than to the cutting face of the other of the cutting element.

In some embodiments, a gap may be defined between the two cutting element support structures. The gap may be defined about the central axis. The drill bit may also include a central debris feature defined between the two cutting element support structures.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
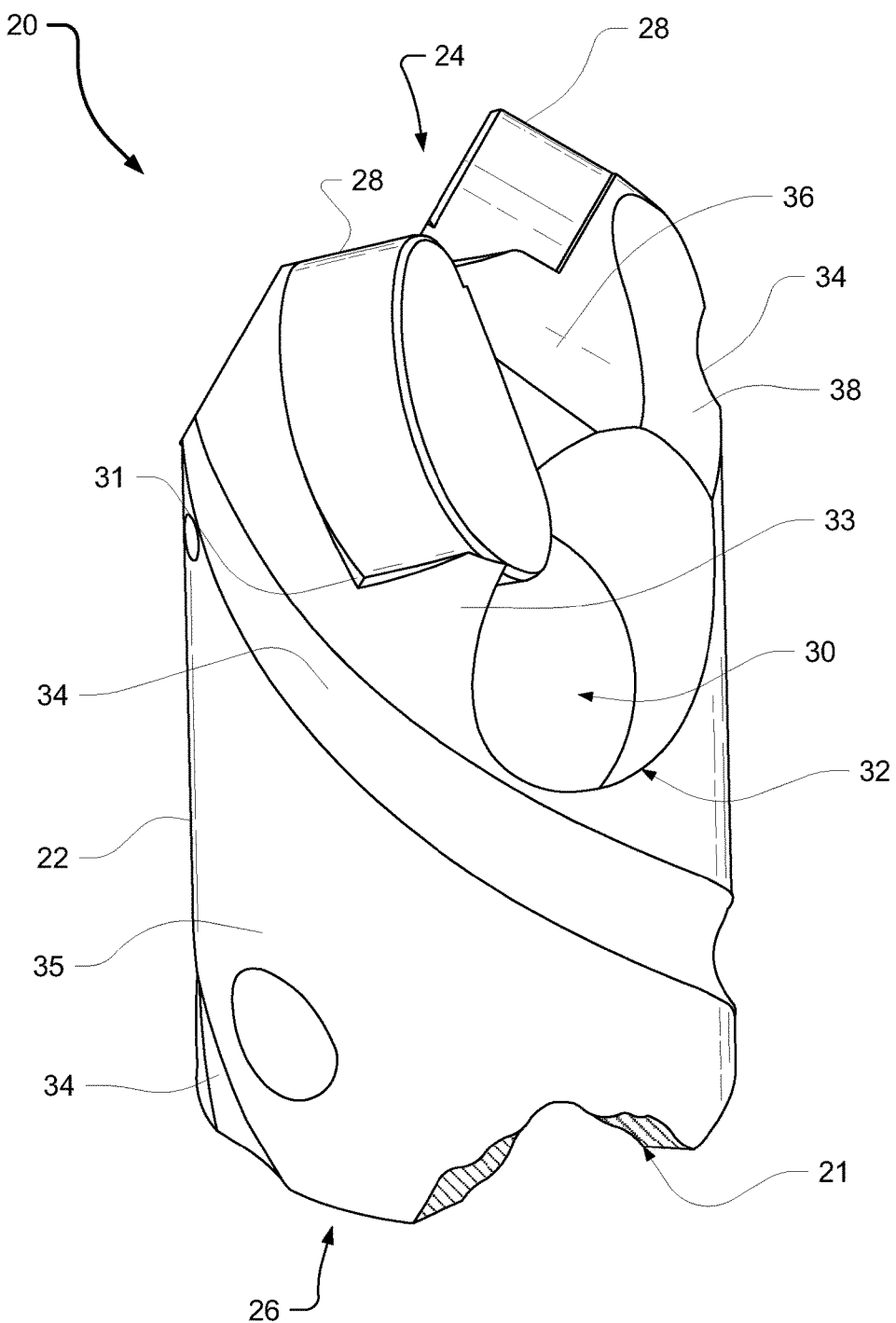
FIG. 1 is a partial cut-away perspective view of an exemplary drill bit according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary rotary drill bits for drilling formations in various environments, including wet-drilling and dry-drilling environments. For example, a rotary drill bit may be coupled to a drill steel and rotated by a rotary drilling apparatus configured to rotate the rotary drill bit relative to a subterranean formation. The phrase "wet-drilling environment," as used herein, may refer to drilling operations where drilling mud, water, and/or other drilling lubricants are supplied to a drill bit during cutting or drilling operation. In contrast, the phrase "dry-drilling environment," as used herein, may refer to drilling operations that do not utilize drilling mud or other liquid lubricants during cutting or drilling operations. For ease of use, the word "cutting," as used in this specification and claims, may refer broadly to machining processes, drilling processes, boring processes, or any other material removal process.

FIG. 1 is a partial cut-away perspective view of an exemplary drill bit 20 according to at least one embodiment. Drill bit 20 may represent any type or form of earth-boring or drilling tool, including, for example, a rotary borehole drill bit. Drill bit 20 may be formed of any material or combination of materials, such as steel or molded tungsten carbide, without limitation.

As illustrated FIG. 1, drill bit 20 may comprise a bit body 22 having a forward end 24 and a rearward end 26. At least one cutting element 28 may be coupled to bit body 22. For example, as shown in FIG. 1, a plurality of cutting elements 28 may be coupled to forward end 24 of bit body 22. Cutting elements 28 may be coupled to bit body 22 using any suitable technique, including, for example, brazing or welding. According to some examples, back surfaces of cutting elements 28 (such as back surface 44 shown in FIG. 2) may be mounted and secured to mounting surfaces on bit body 22, such as mounting surface 31 shown in FIG. 1. Additionally, each cutting element 28 may be positioned on bit body 22 adjacent to and/or abutting a support member 33. As illustrated in FIG. 1, support member 33 may comprise a projection extending away from mounting surface 31. Support member 33 may counteract various forces applied to cutting element 28 during drilling, including forces acting on cutting element 28 in a generally rearward direction, thereby preventing a separation of cutting element 28 from bit body 22.

In at least one embodiment, an internal passage 30 may be defined within bit body 22. As illustrated in FIG. 1, in some embodiments internal passage 30 may extend from a rearward opening 21 defined in rearward end 26 of bit body 22 to at least one side opening 32 defined in a side portion of bit body 22. As shown in FIG. 1, a side opening 32 may be disposed adjacent a cutting element 28. Side openings 32 may also be disposed axially rearward of cutting elements 28 (i.e., between cutting elements 28 and rearward end 26 of bit body 22). In one example, internal passage 30 may be configured to draw debris, such as rock cuttings, away from cutting elements 28. For example, a vacuum source may be attached to rearward opening 21 of internal passage 30 to draw cutting debris away from cutting elements 28 and through side opening 32 into internal passage 30.

In some embodiments, bit body 22 may have a peripheral side surface 35 defining an outer periphery of bit body 20. In some examples, peripheral side surface 35 may comprise a generally cylindrical shape. Peripheral side surface 35 may also comprise any other suitable shape and/or configuration, without limitation. As will be illustrated in greater detail below in connection with FIG. 3, peripheral side surface 35 may extend to a radial distance that is less than or approximately the same as outer edge portions (e.g., portions of chamfers 42 illustrated in FIG. 3) of cutting elements 28. Accordingly, peripheral side surface 35 may inhibit debris from falling around an outer portion of bit body 22 during drilling, thereby directing debris through side openings 32.

Bit body 22 may also comprise at least one peripheral channel 34 defined in a peripheral portion of bit body 22. For example, as shown in FIG. 1, peripheral channels 34 may be formed in peripheral portions of bit body 22 adjacent peripheral side surface 35. Peripheral channels 34 may extend between rearward end 26 and forward end 24 and/or a side portion of bit body 22. Peripheral channels 34 may comprise any suitable shape and configuration. For example, peripheral channels 34 may each comprise a helical groove extending around bit body 22 in a generally helical path. As will be described in greater detail below in connection with FIG. 5, peripheral channels 34 may be configured to direct a fluid (e.g., a liquid and/or a gas), such as air, from rearward end 26 toward forward end 24 of bit body 22 during drilling.

At least one forward debris path 36 may be defined in bit body 22 to guide debris, such as rock cuttings, into internal passage 30. Forward debris path 36 may be formed in a variety of shapes and sizes, such as the substantially concave shape illustrated in FIG. 1. In one example, forward debris path 36 may be disposed adjacent at least one of cutting elements 28 and may extend generally between forward end 24 of bit body 22 and side opening 32.

In some embodiments, bit body 22 may comprise an inward sloping surface 38 extending between a forward portion of helical channel 34 and side opening 32. Inward sloping surface 38 may also extend inward from a side portion of bit body 22, such as peripheral channel 34. According to at least one example, during use of drill bit 20, air directed through peripheral channel 34 may be drawn across inward sloping surface 38 toward internal passage 30 and/or forward debris path 36.

Figure 2:
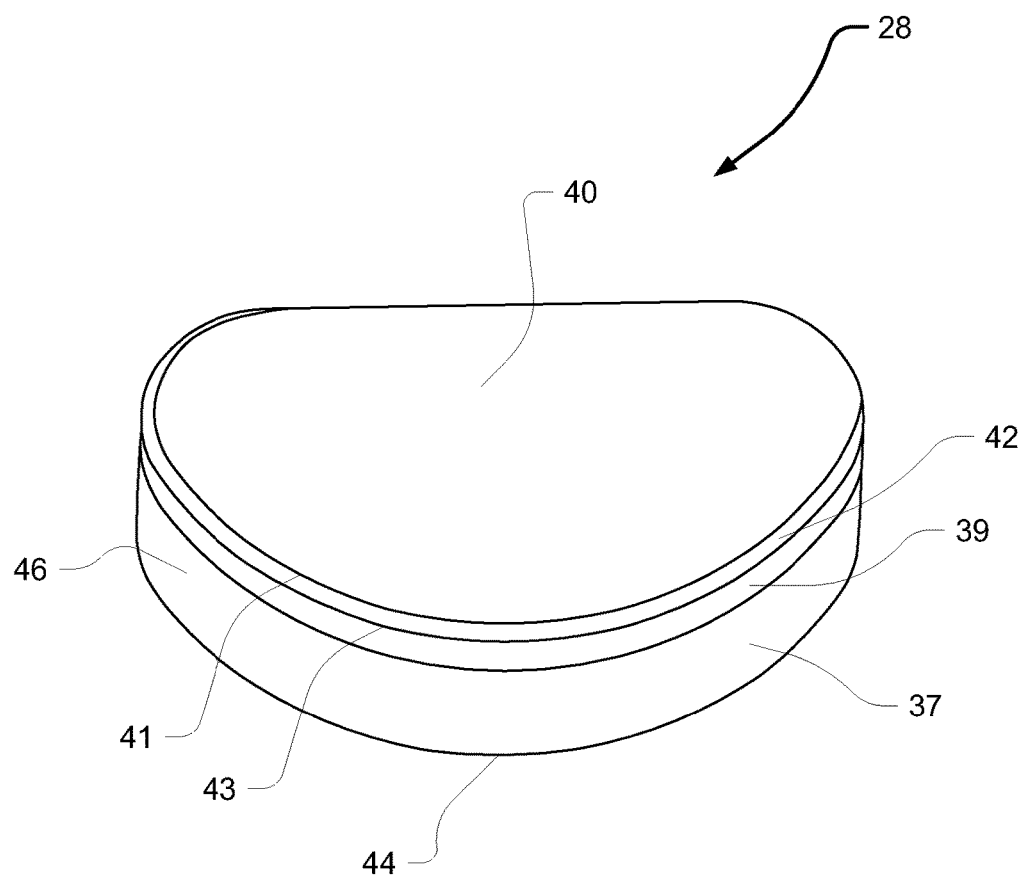
FIG. 2 is a perspective view of an exemplary cutting element according to at least one embodiment.

FIG. 2 is a perspective view of an exemplary cutting element 28 that may be coupled to exemplary bit body 22 in FIG. 1. As illustrated in FIG. 2, cutting element 28 may comprise a layer or table 39 affixed to or formed upon a substrate 37. Table 39 may be formed of any material or combination of materials suitable for cutting subterranean formations, including, for example, a superhard or superabrasive material such as polycrystalline diamond (PCD). The word "superhard," as used herein, may refer to any material having a hardness that is at least equal to a hardness of tungsten carbide. Similarly, substrate 37 may comprise any material or combination of materials capable of adequately supporting a superabrasive material during drilling of a subterranean formation, including, for example, cemented tungsten carbide.

For example, cutting element 28 may comprise a table 39 comprising polycrystalline diamond bonded to a substrate 37 comprising cobalt-cemented tungsten carbide. In at least one embodiment, after forming table 39, a catalyst material (e.g., cobalt or nickel) may be at least partially removed from table 39. A catalyst material may be removed from table 39 using any suitable technique, such as, for example, acid leaching. In some examples, table 39 may be exposed to a leaching solution until a catalyst material is substantially removed from table 39 to a desired depth relative to one or more surfaces of table 39.

In at least one embodiment, substrate 37 may be at least partially covered with a protective layer, such as, for example, a polymer cup, to prevent corrosion of substrate 37 during leaching. In additional embodiments, table 39 may be separated from substrate 37 prior to leaching table 39. For example, table 39 may be removed from substrate 37 and placed in a leaching solution so that all surfaces of table 39 are at least partially leached. In various examples, table 39 may be reattached to substrate 37 or attached to a new substrate 37 following leaching. Table 39 may be attached to substrate 37 using any suitable technique, such as, for example, brazing, welding, or HPHT processing.

As shown in FIG. 2, cutting element 28 may also comprise a cutting face 40 formed by table 39, a side surface 46 formed by table 39 and substrate 37, and a back surface 44 formed by substrate 37. According to various embodiments, cutting face 40 may be substantially planar and side surface 46 may be substantially perpendicular to cutting face 40. Back surface 44 may be opposite and, in some embodiments, substantially parallel to cutting face 40.

Cutting face 40 and side surface 46 may be formed in any suitable shape, without limitation. In one example, cutting face 40 may have a substantially arcuate periphery. In another example, cutting face 40 may have a substantially semi-circular periphery. For example, two cutting elements 28 may be cut from a single substantially circular cutting element blank, resulting in two substantially semi-circular cutting elements 28. In some examples, angular portions of side surface 46 may be rounded to form a substantially arcuate surface around cutting element 28.

As illustrated in FIG. 2, cutting element 28 may also comprise a chamfer 42 formed along at least a portion of a periphery of table 39 between cutting face 40 and side surface 46. In some embodiments, and as illustrated FIG. 2, table 39 may include a chamfer 42. Table 39 may also include any other suitable surface shape between cutting face 40 and side surface 46, including, without limitation, an arcuate surface, a sharp edge, and/or a honed edge. Chamfer 42 may be configured to contact and/or cut a subterranean formation as drill bit 20 is rotated relative to the formation (as will be described in greater detail below in connection with FIG. 5). In at least one embodiment, the phrase "cutting edge" may refer to an edge portion of cutting element 28 that is exposed to and/or in contact with a formation during drilling. In some examples, cutting element 28 may comprise one or more cutting edges, such as an edge 41 and/or or an edge 43. Edge 41 and/or edge 43 may be formed adjacent chamfer 42 and may be configured to be exposed to and/or in contact with a formation during drilling.

Figure 3:
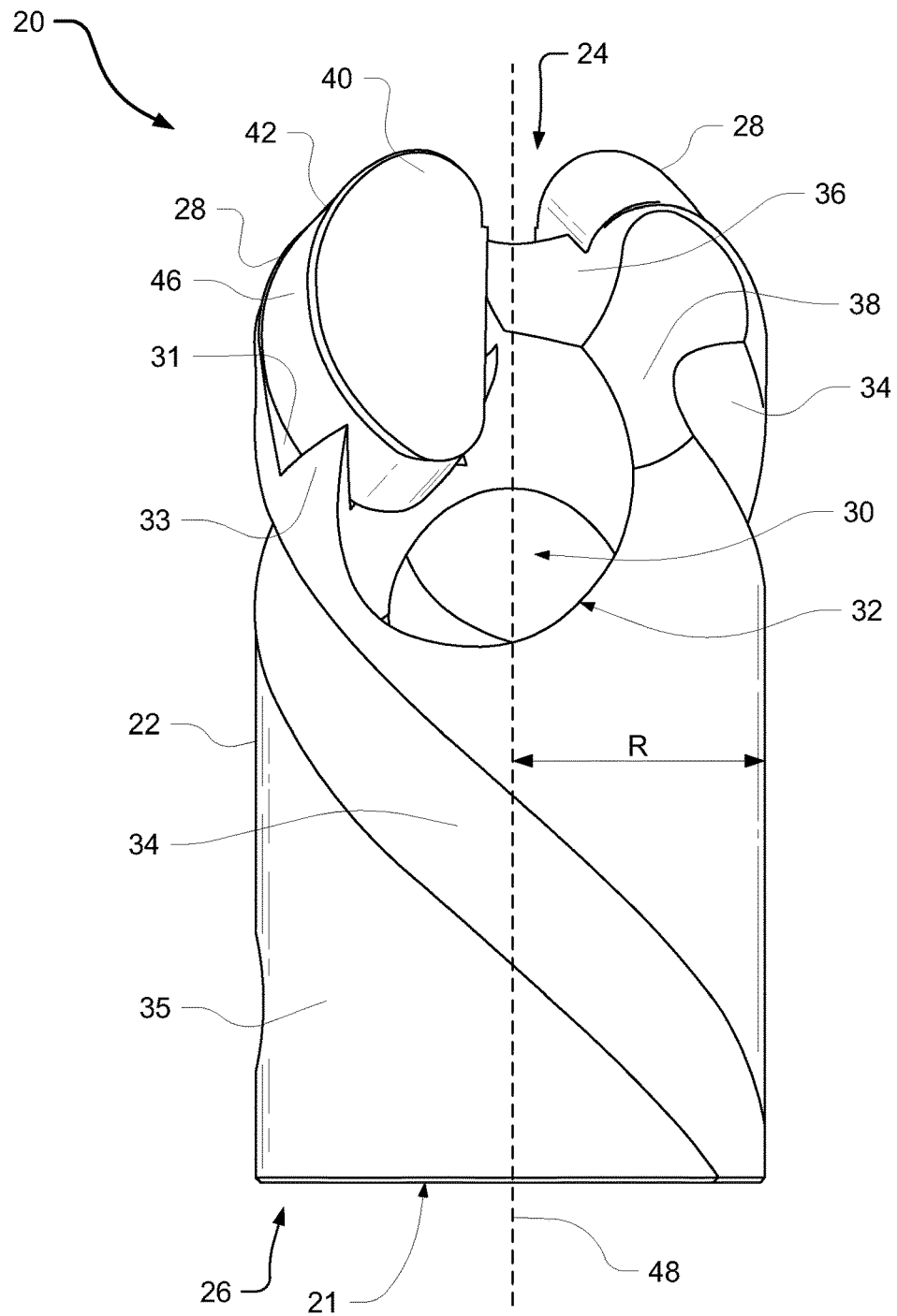
FIG. 3 is a side view of the exemplary drill bit illustrated in FIG. 1.
Figure 4:
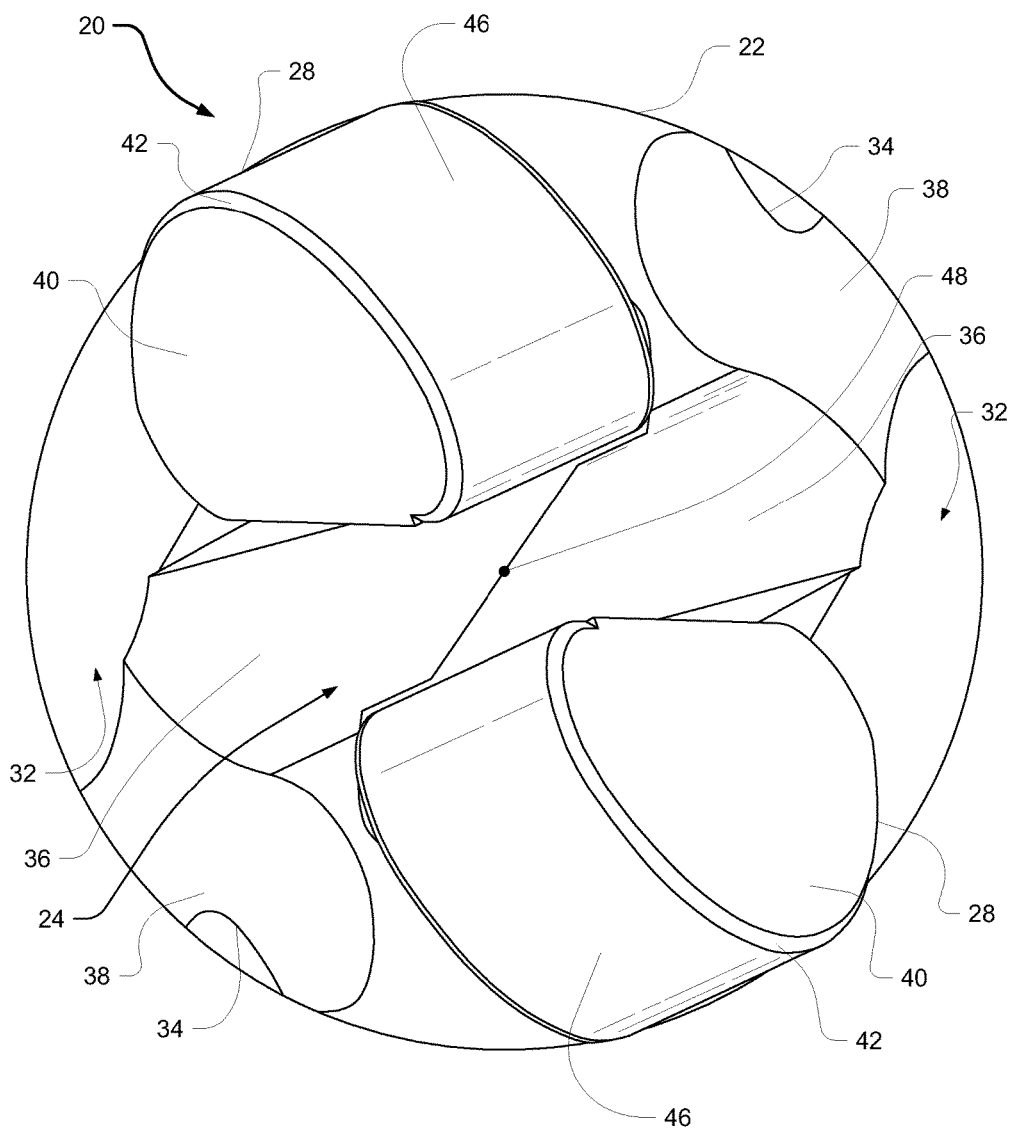
FIG. 4 is a top view of the exemplary drill bit illustrated in FIG. 1.

FIG. 3 is a side view and FIG. 4 is a top view of the exemplary drill bit 20 illustrated in FIG. 1. As illustrated in FIGS. 3 and 4, drill bit 20 may be centered around and/or may be rotatable about a central axis 48. Central axis 48 may extend in a lengthwise direction through drill bit 20 between forward end 24 and rearward end 26.

In some embodiments, cutting elements 28 may be substantially centered and/or uniformly spaced about central axis 48. For example, as illustrated in FIG. 4, two cutting elements 28 may be oppositely oriented about central axis 48. In at least one example, the two cutting elements 28 may be positioned approximately 180° apart from each other relative to central axis 48. Additionally, each of cutting elements 28 may be positioned on drill bit 20 at substantially the same back-rake and/or side-rake angle with respect to central axis 48.

As illustrated in FIG. 3, peripheral side surface 35 may be located at a radial distance R relative to central axis 48. Radial distance R may be substantially the same as the radial distance to which a portion of cutting elements 28 (such as chamfers 42) extend. Accordingly, peripheral side surface 35 may inhibit debris from moving past an outer portion of bit body 22 during drilling. In various examples, portions of cutting elements 28 (such as cutting edges 42) may extend radially beyond peripheral side surface 35.

Figure 5:
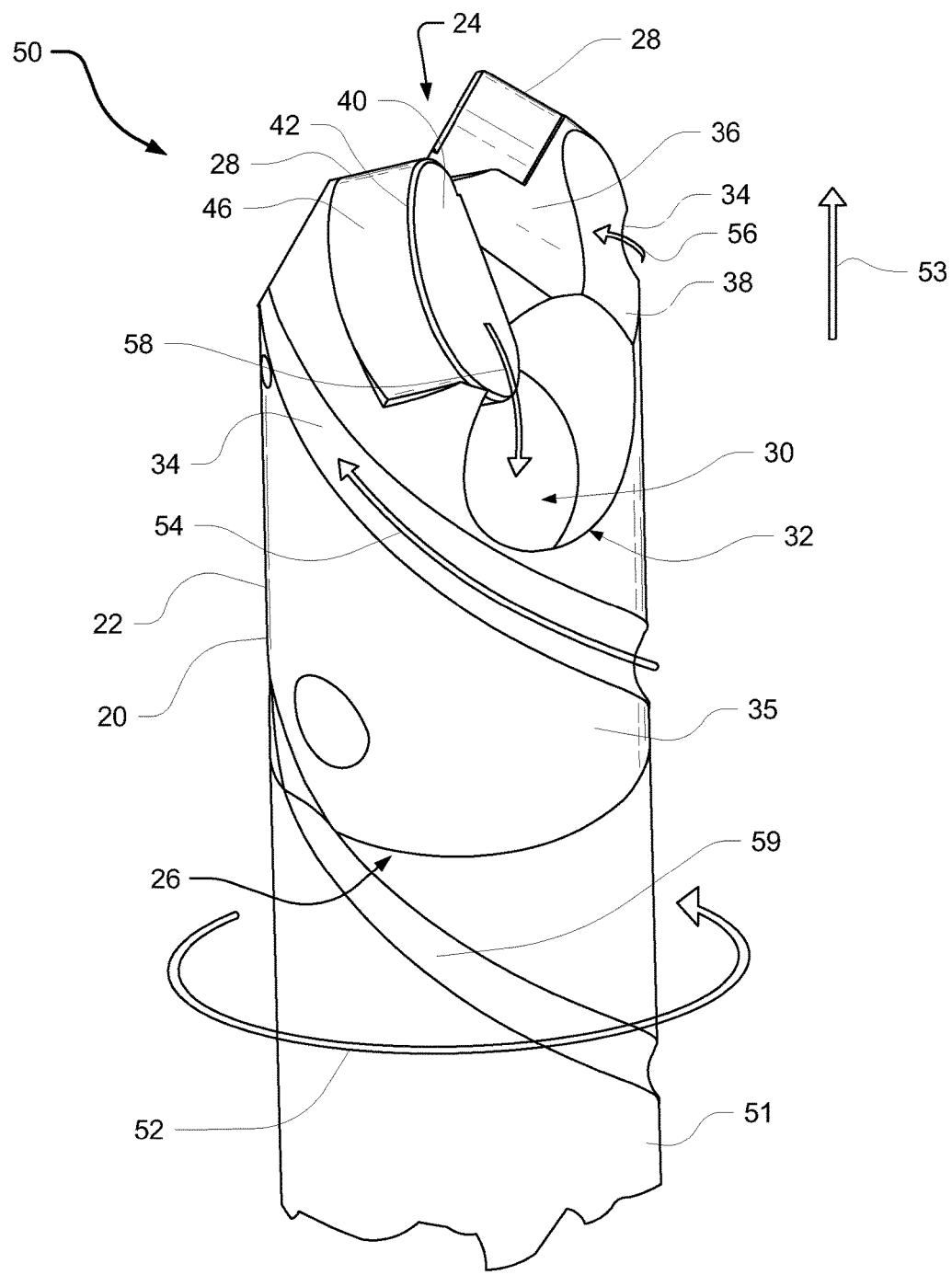
FIG. 5 is a partial perspective view of an exemplary drilling apparatus including the drill bit of FIG. 1 according to at least one embodiment.

FIG. 5 is a perspective view of a portion of an exemplary drilling apparatus 50 comprising the drill bit 20 illustrated in FIG. 1 coupled to a drill steel 51. FIG. 5 illustrates flow patterns of a fluid, such as air, during a drilling operation in which a vacuum is applied to a drilling area via internal passage 30 defined in bit body 22. As shown in FIG. 5, rearward end 26 of drill bit 20 may be coupled to drill steel 51 (e.g., by threaded connection, pin connection, and/or other suitable coupling). Drill steel 51 may comprise any suitable type of drill rod configured to connect drill bit 20 to a drilling apparatus, without limitation. In some examples, drill steel 51 may comprise a substantially elongated and/or cylindrical shaft having coupling surfaces corresponding to surfaces defined within drill bit 20. For example, drill steel 51 may comprise a hexagonal and/or threaded periphery corresponding to a hexagonal and/or threaded interior surface defined within drill bit 20. In some examples, drill steel 51 may comprise a pin connector corresponding to a pin hole and/or a recess defined within drill bit 20.

According to at least one embodiment, force may be applied by a drilling motor to drill bit 20 via drill steel 51, causing drill bit 20 to be forced against a subterranean formation in both a rotational direction 52 and a forward direction 53. As illustrated in FIG. 5, cutting faces 40 on cutting elements 28 may face generally in rotational direction 52 and may be angled with respect to rotational direction 52. As drill bit 20 is forced against a subterranean formation and rotated in rotational direction 52, cutting faces 40 and/or chamfers 42 of cutting elements 28 may contact and cut into the formation, removing rock material from the formation in the form of rock cuttings and/or other debris. The cuttings removed by cutting elements 28 may be drawn through internal passage 30 by a vacuum applied to drill bit 20.

According to at least one embodiment, drilling apparatus 50 may be used to drill a borehole in an overhead surface structure, such as a mine roof. In such an embodiment, drill bit 20 may be axially oriented in a substantially vertical direction so that the forward end 24 of drill bit 20 faces toward a ceiling/wall (e.g., direction 53) of a coal mine. As material is removed from the structure by cutting elements 28, at least some of the resulting debris may pass through side opening 32 into internal passage 30. For example, debris may be drawn through side opening 32 into internal passage 30 by a vacuum applied to the drill bit 20. According to some embodiments, drill steel 51 may comprise a hollow rod and a vacuum may be applied to a rearward end of drill steel 51 by a vacuum source. Cutting debris may be drawn by the vacuum through drill bit 20 and drill steel 51 toward the vacuum source. Forward debris path 36 may facilitate movement of debris from cutting elements 28 and/or forward end 34 of drill bit 20 toward internal passage 30 in drill bit 20.

Peripheral channel 34 may be sized and configured to direct and/or draw a fluid, such as air or another suitable drilling fluid, from rearward end 26 toward forward end 24 of drill bit 20. As shown in FIG. 5, peripheral channel 34 may comprise a groove extending along a generally helical path between rearward end 26 and a side portion of drill bit 20. Peripheral channel 34 may also comprise any other suitable shape or configuration for drawing a fluid from rearward end 26 toward forward end 24, without limitation. For example, peripheral channel 34 may comprise a groove extending along bit body 20 generally in direction 53 between rearward end 26 and a side portion of drill bit 20. In at least one example, peripheral channel 34 may be defined radially inward from peripheral side surface 35. For example, peripheral side surface 35 may be formed at a peripheral radial distance relative to central axis 48 and surfaces defining peripheral channel 34 may be located radially inward from the peripheral radial distance.

During drilling of a borehole, peripheral side surface 35 may be located adjacent a wall surface of the borehole. Because peripheral channel 34 is defined radially inward from peripheral side surface 35, a larger gap may be formed between a surface of peripheral channel 34 and a borehole surface than is formed between peripheral side surface 35 and the borehole surface. The gap between peripheral channel 34 and the borehole surface may provide an effective flow path for air or other drilling fluids during drilling. In some examples, the rotation of drill bit 20 in rotational direction 52 and/or the vacuum applied to drill bit 20 via internal passage 30 may force a significant portion of air through peripheral channel 34 in a helical direction 54 toward forward end 24 of drill bit 20.

According to at least one embodiment, peripheral channel 34 may slope away from rearward end 26 of drill bit 20 in a direction generally opposite rotational direction 52. For example, as illustrated in FIG. 5, peripheral channel 34 may slope generally in helical direction 54 toward forward end 24. Accordingly, as drill bit 20 rotates in rotational direction 52, air may be drawn up through peripheral channel 34 in helical direction 54 toward forward end 24 by a vacuum applied to internal passage 30 and air may be forced up through peripheral channel 34 by the rotation of drill bit 20. In some examples, a peripheral channel may also be formed in a peripheral portion of drill steel 51. For example, as shown in FIG. 5, a peripheral channel 59 corresponding to peripheral channel 34 may be defined in a peripheral portion of drill steel 51. A forward portion of peripheral channel 59 may be aligned with a rearward portion of peripheral channel 34 when drill bit 20 is coupled to drill steel 51. Accordingly, as drill steel 51 and drill bit 20 are rotated in rotational direction 52, air may be forced and/or drawn up through peripheral channel 59 formed in drill steel 51 toward peripheral channel 34 formed in drill bit 20. In at least one example, peripheral channel 59 may comprise a generally helical channel.

In some embodiments, peripheral channel 34 defined in bit body 22 may terminate at a portion of bit body 22 adjacent at least one of cutting elements 28. In at least one example, the forward end of peripheral channel 34 may terminate at inward sloping surface 38 near forward end 24 of drill bit 20. Air from peripheral channel 34 may flow over inward sloping surface 38 toward side opening 32 and/or forward debris path 36. For example, air may exit peripheral channel 34 in general direction 56. Air and cutting debris may then be drawn into internal passage 30 by a vacuum applied to internal passage 30. For example, air may be drawn over cutting elements 28 toward internal passage 30 in general direction 58. Air and cutting debris may also be drawn into internal passage 30 from other directions. For example, air and cutting debris may be drawn into internal passage 30 from cutting elements 28, forward debris path 36, and/or inward sloping surface 38.

In some examples, peripheral channel 34 formed in bit body 22 of drill bit 20 may extend along only a portion of bit body 22 between rearward end 26 and forward end 24 and/or a side portion of bit body 22. For example, bit body 22 may comprise a section disposed axially rearward of peripheral side surface 35 that is narrower than peripheral side surface 35. In such an embodiment, peripheral channel 34 may only extend between the section disposed axially rearward of peripheral side surface 35 and forward end 24 and/or a side portion of bit body 22.

The shape, position, and/or orientation of peripheral channel 34 may be selected so as to increase the effectiveness of drill bit 20 in cooling portions of cutting elements 28 and/or portions of bit body 22 during drilling. The shape, position, and/or orientation of peripheral channel 34 may also be selected so as to increase the effectiveness of drill bit 20 in removing material from an area around a forward portion of drill bit 20 during drilling. According to various embodiments, peripheral channel 34 may facilitate air flow created by a vacuum applied to internal passage 30 by increasing the flow of air or other fluid to a forward portion of drill bit 20.

Figure 6:
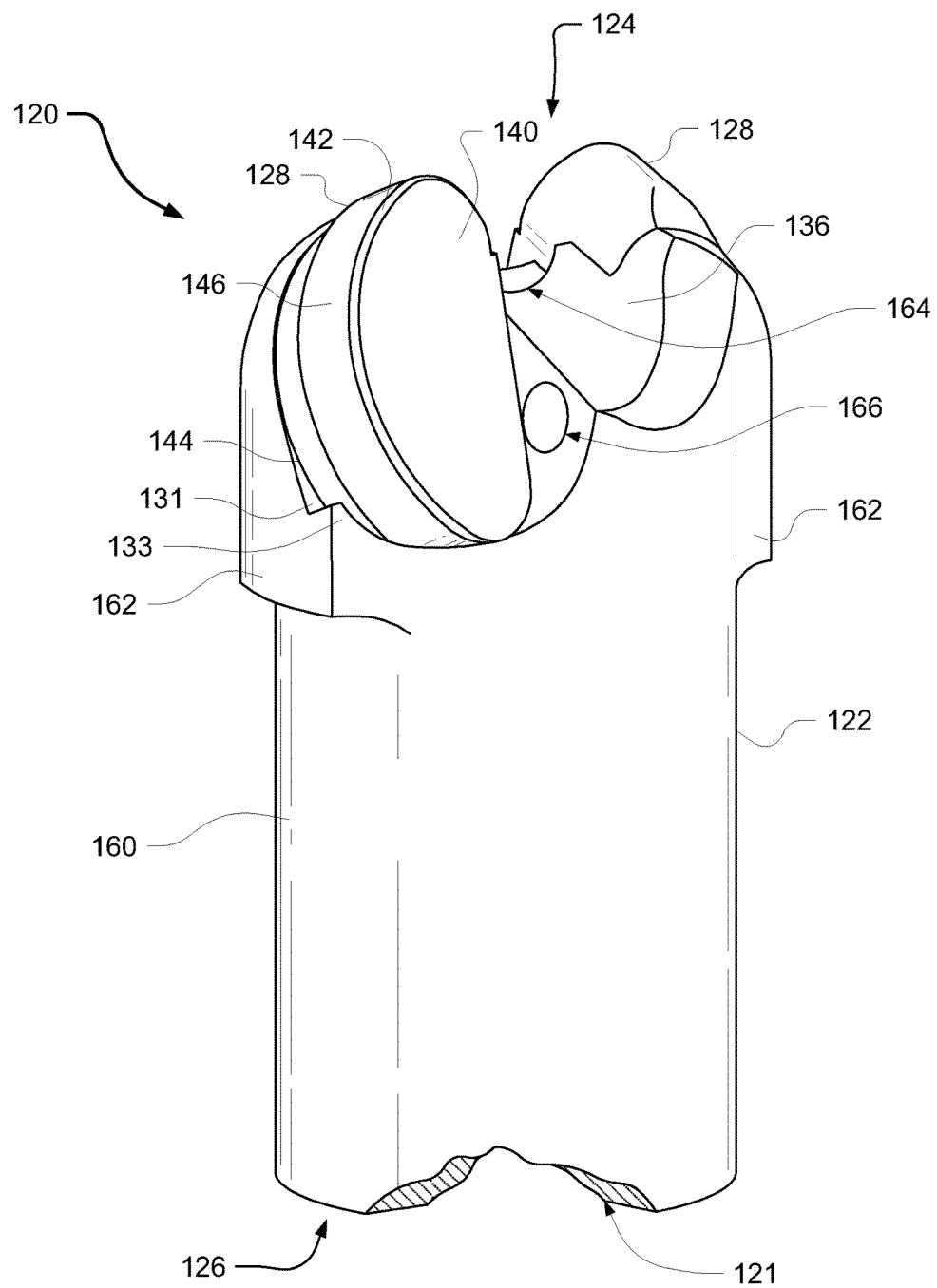
FIG. 6 is a perspective view of an exemplary drill bit according to at least one embodiment.
Figure 7:
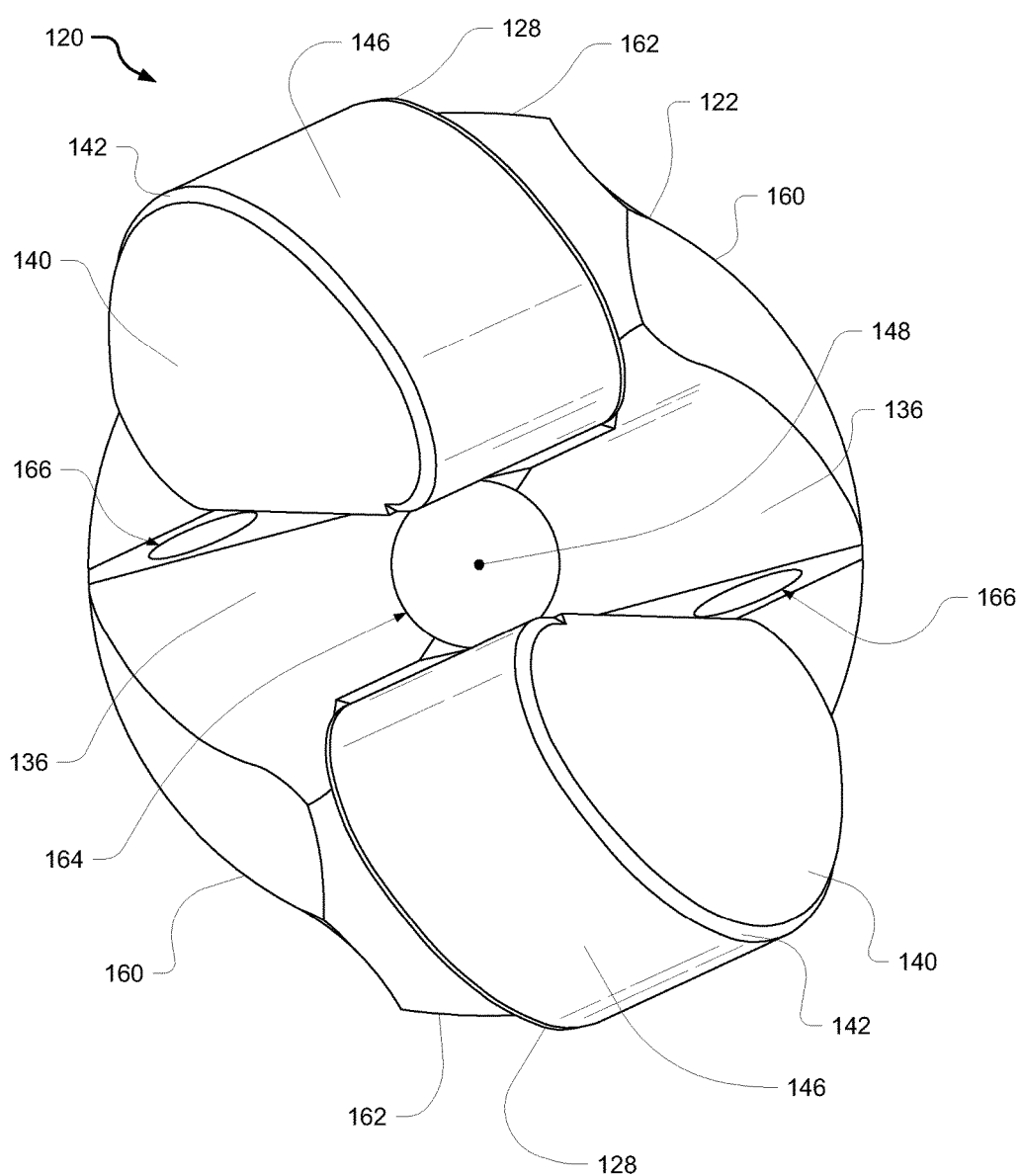
FIG. 7 is top view of the exemplary drill bit illustrated in FIG. 6.

FIGS. 6-9 illustrate an exemplary drill bit 120 according to at least one embodiment. FIG. 6 is a partial cut-away perspective view of an exemplary drill bit 120 and FIG. 7 is a top view of the exemplary drill bit 120. Drill bit 120 may represent any type or form of earth-boring or drilling tool, including, for example, a rotary borehole drill bit.

As illustrated in FIGS. 6 and 7, drill bit 120 may comprise a bit body 122 having a forward end 124 and a rearward end 126. At least one cutting element 128 may be coupled to bit body 122. Back surfaces 144 of cutting elements 128 may be mounted and secured to mounting surfaces 131. Cutting elements 128 may comprise a cutting face 140, a side surface 146, a back surface 144, and a chamfer 142 formed along an intersection between cutting face 140 and side surface 146. Drill bit 120 may also comprise a main body 160 and at least one cutting element support structure 162 extending radially outward and/or offset from main body 160 (as will be described in greater detail below in connection with FIG. 9). In some examples, drill bit 120 may not include cutting element support structures 162 extending radially outward from main body 160. Cutting elements 128 may be mounted to bit body 122 so that portions of cutting elements 128 abut support members 133.

Bit body 122 may also comprise at least one forward opening 164 and/or at least one side opening 166. As illustrated in FIGS. 6 and 7, forward opening 164 may be defined in bit body 22 adjacent forward end 124 of bit body 122 and side openings 166 may be defined in bit body 22 adjacent cutting elements 128. Additionally, a rearward opening 121 may be defined in rearward end 126 of bit body 122. According to at least one embodiment, drill bit 120 may be configured such that a drilling fluid may flow through rearward opening 121 to forward opening 164 and/or side openings 166.

Figure 8:
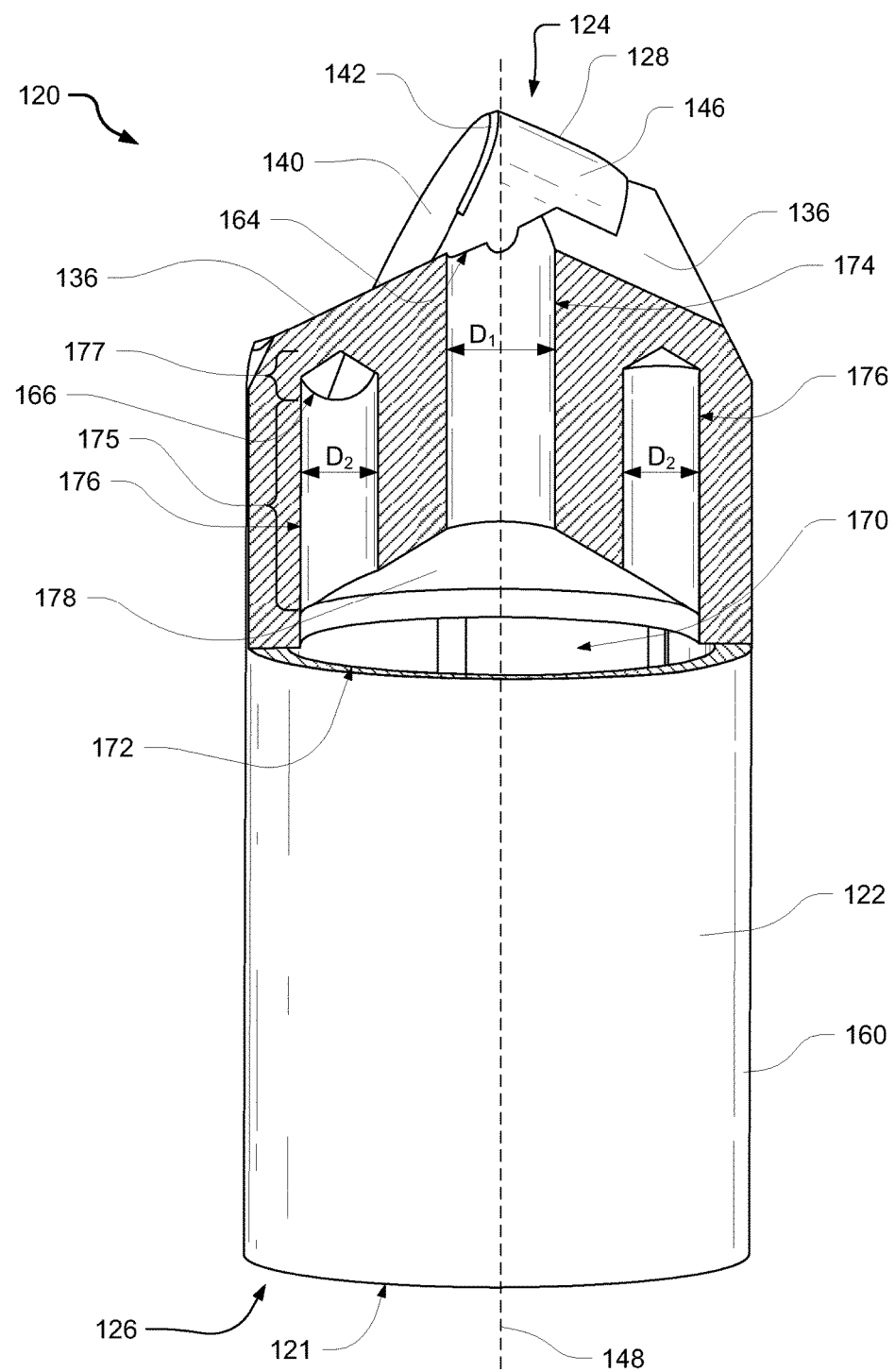
FIG. 8 is a partial cross-section side view of the exemplary drill bit illustrated in FIG. 6.

FIG. 8 is a partial cross-sectional perspective view of a drill bit 120 according to certain embodiments. As shown in FIG. 8, bit body 122 may include various fluid passages extending between rearward opening 121 and forward opening 164 and/or side openings 166. For example, an internal passage 170 may be defined within bit body 122. Internal passage 170 may extend from rearward opening 121 to a portion of bit body 122 where two or more passages are defined. For example, internal passage 170 may extend to an internal surface 178 defined within bit body 122. According to some embodiments, internal surface 178 may comprise a tapered surface extending between internal passage 170 and a central passage 174 defined within bit body 122. Internal surface 178 may also comprise a generally flat, concave, and/or any other suitable surface shape, without limitation. Central passage 174 may extend between internal surface 178 and forward opening 164. In some examples, central passage 174 may extend in a direction substantially parallel to central axis 148. In at least one example, central passage 174 may extend in a nonparallel direction relative to central axis 148.

At least one side passage 176 may also be defined within bit body 122. In at least one example, one or more of side passages 176 may extend from central passage 174. In some embodiments, central passage 174 may have a larger diameter than the at least one side passage 176. The at least one side passages 176 may extend between internal surface 178 and side opening 166 and may be radially offset from central passage 174. In some examples, the at least one side passage 176 may include a first section 175 and a second section 177. First section 175 may extend from internal surface 178, internal passage 172, and/or central passage 174 and second section 177 may extend between first section 175 and side opening 166.

In at least one example, first section 175 may extend in a direction substantially parallel to central axis 148. First section 175 may also extend in a nonparallel direction relative to central axis 148. In some examples, second section 177 may extend in a nonparallel direction relative to central axis 148. For example, second section 177 may include a curved and/or angled portion configured to direct a fluid from first section 175 through side opening 166 in a nonparallel direction relative to central axis 148. In various embodiments, second section 177 may be configured to direct a fluid from side opening 166 at an angle of from 15° to 180° from a forward direction parallel to central axis 148.

Figure 9:
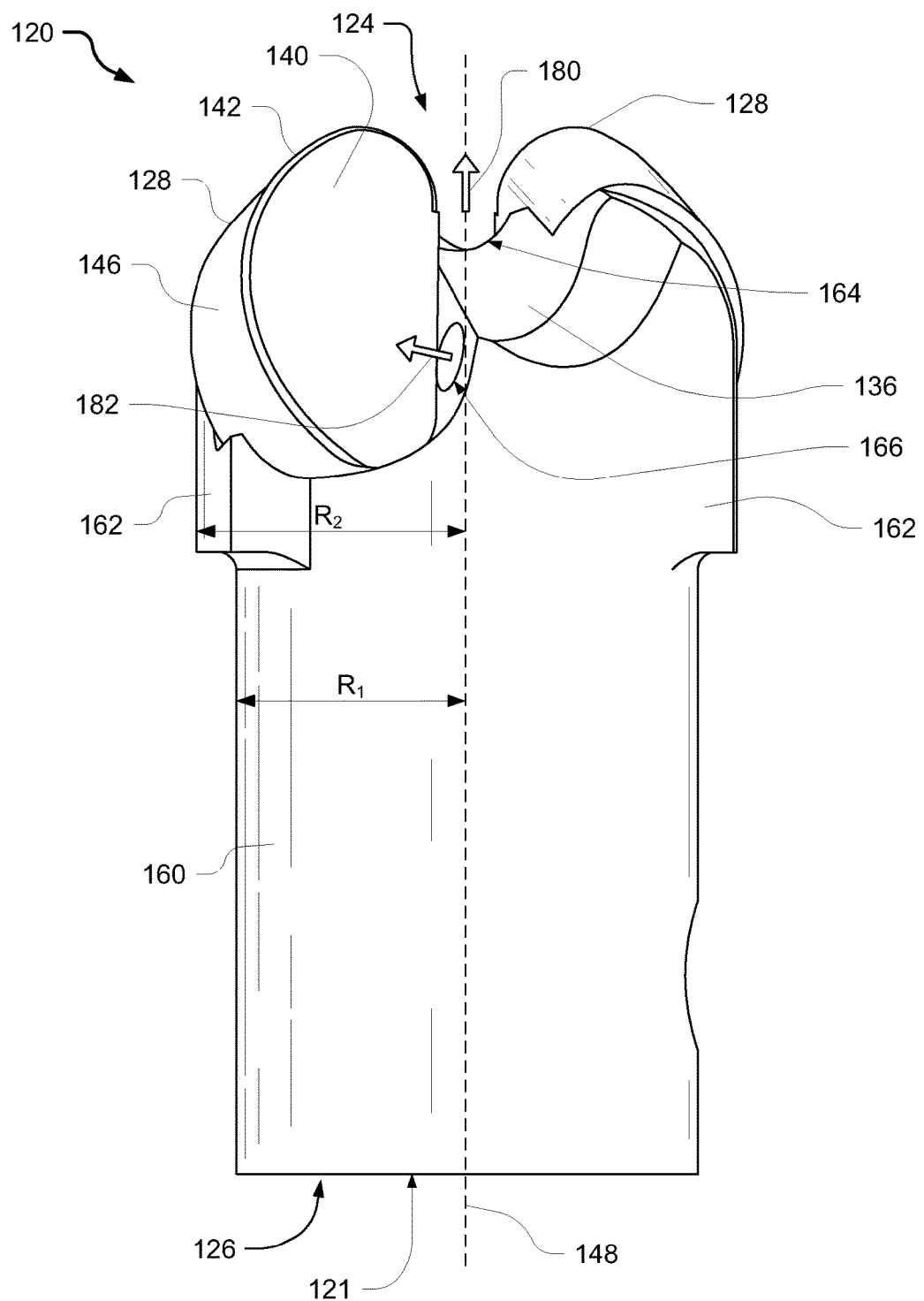
FIG. 9 is a side view of an exemplary drill bit illustrated in FIG. 6.

FIG. 9 is a side view of a portion of the exemplary drill bit 120 illustrated in FIG. 6. FIG. 9 illustrates flow patterns of a drilling fluid (such as drilling mud and/or air) during a drilling operation in which the drilling fluid is directed under pressure through rearward opening 121 toward a forward portion of drill bit 120. As shown in FIG. 9, a drilling fluid may be directed from forward opening 164 generally in direction 180 and/or from at least one side opening 166 generally in direction 182. Direction 180 may be substantially parallel to central axis 148 and direction 182 may be nonparallel relative to central axis 148. The drilling fluid exiting forward opening 164 and/or side openings 166 may flow over portions of cutting elements 128, such as portions of cutting faces 140 and/or chamfers 142. Additionally, the drilling fluid exiting forward opening 164 and/or side openings 166 may contact portions of a borehole that is being drilled by drill bit 120. As the drilling fluid contacts portions of the borehole and/or cutting elements 128, the drilling fluid may carry away rock cuttings and/or other debris generated during drilling. The size, shape, number, and/or directional orientation of forward opening 164 and/or side openings 166 may be selected so as to increase the effectiveness of drill bit 120 in cooling portions of cutting elements 128 and/or to increase the effectiveness of drill bit 120 in removing material from a cutting area near forward end 124 of drill bit 120.

As additionally illustrated in FIG. 9, main body 160 of bit body 122 may extend to a first radial distance $R_1$ relative to central axis 148. Additionally, the at least one cutting element support structure 162 may extend to a second radial distance $R_2$ that is greater than first radial distance $R_1$ relative to central axis 148. At least one cutting element 128 may be mounted to the at least one cutting element support structure 162 and at least a portion of the at least one cutting element 128, such as chamfer 142, may extend to a greater radial distance than first radial distance $R_1$ relative to central axis 148.

Because cutting element support structures 162 and/or cutting elements 128 extend to greater radial distances than main body 160, a space may be formed between a borehole being drilled by drill bit 120 and an outer peripheral surface of main body 160. Drilling fluid expelled from forward opening 164 and/or side openings 166 may carry cutting debris over cutting elements 128 and/or through forward debris path 136 and over main body 160 of bit body 122 through the space formed between the borehole and main body 160. A portion of main body 160 located between cutting element support structures 162 may permit drilling fluid and/or cutting debris to pass between cutting element support structures 162 toward rearward end 126. In some embodiments, channels may be formed in a peripheral portion of bit body 122 to direct the flow of material away from cutting elements 128 along a specified path (as will be described in greater detail below in connection with FIG. 10).

According to various embodiments, central passage 174 may have a larger diameter than side passages 176. For example, as illustrated in FIG. 8, central passage 174 may have a diameter $D_1$ that is larger than diameters $D_2$ of side passages 176. During a drilling operation, a drilling fluid may be forced under pressure through central passage 174 and/or side passages 176. Because central passage 174 has a larger diameter than side passages 176, a greater volume of drilling fluid may pass through central passage 174 when central passage 174 is unobstructed. However, central passage 174 may become at least partially blocked by cutting debris during drilling.

For example, cutting debris, such as a rock chip separated from a rock formation being drilled, may become lodged within at least a portion of forward opening 164 and/or central passage 174, limiting the flow of drilling fluid through central passage 174. When central passage 174 becomes blocked by debris, the fluid pressure in bit body 122 may be increased and a greater volume of drilling fluid may be forced through side passages 176 in a nonparallel direction.

Figure 10:
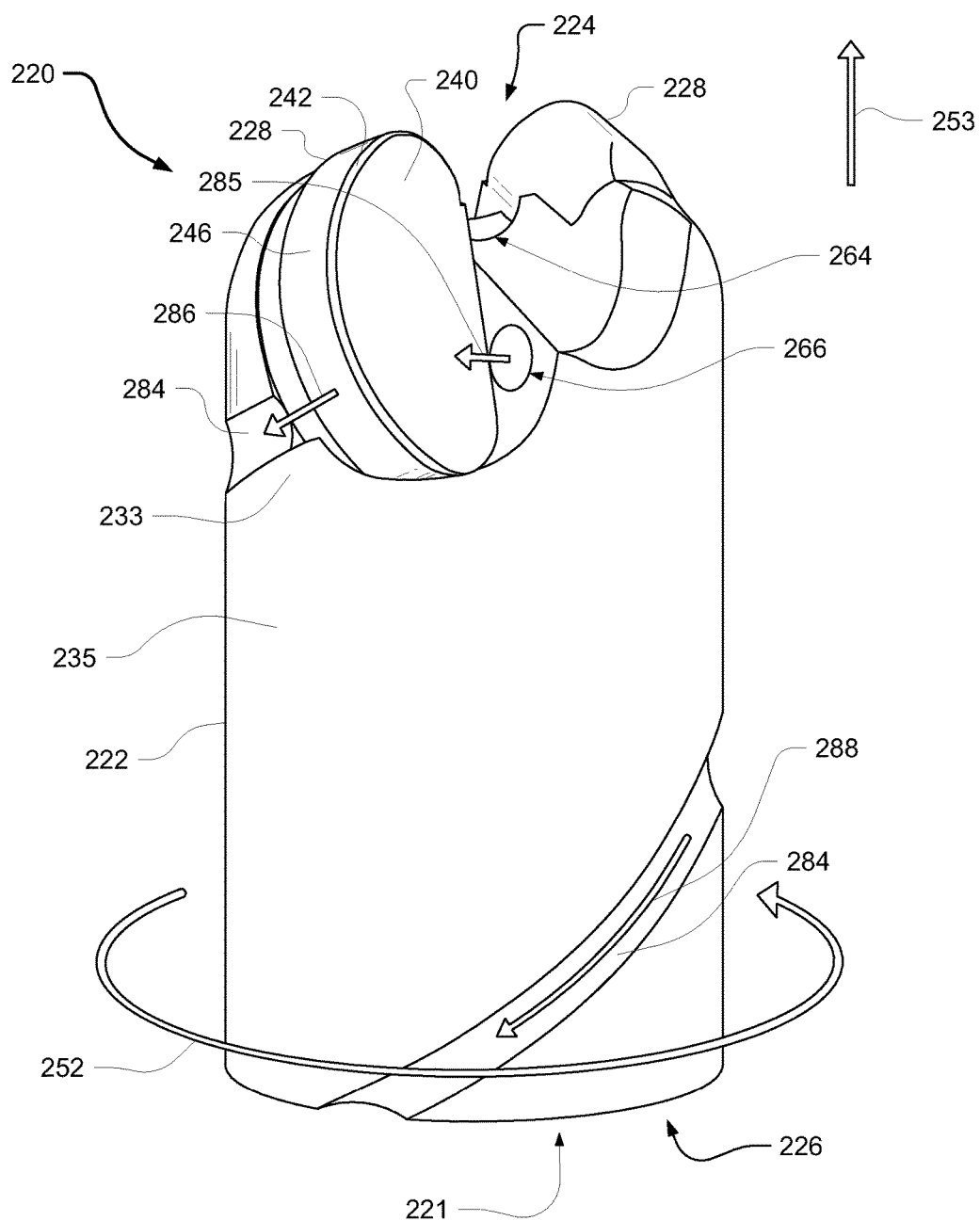
FIG. 10 is a perspective view of an exemplary drill bit according to at least one embodiment.

FIG. 10 is a perspective view of an exemplary drill bit 220 according to at least one embodiment. As illustrated FIG. 10, drill bit 220 may comprise a bit body 222 having a forward end 224 and a rearward end 226. At least one cutting element 228 may be mounted and secured to bit body 222. Cutting elements 228 may comprise a cutting face 240, a side surface 246, and a chamfer 242 formed along an intersection between cutting face 240 and side surface 246. Cutting elements 228 may be mounted to bit body 222 so that portions of cutting elements 228 abut support members 233. Bit body 222 may also have a peripheral side surface 235 defining an outer periphery of drill bit 220.

A forward opening 264 and at least one side opening 266 may be defined in bit body 222. In some embodiments, a drilling fluid (such as air and/or drilling mud) may be directed from a rearward opening 221 defined in rearward end 226 to forward opening 264 and/or side openings 266. For example, passages may be defined within bit body 222 (e.g., internal passage 170, central passage 174, and/or side passages 176) for directing the drilling fluid between rearward opening 221 and forward opening 264 and/or side openings 266.

According to at least one embodiment, a peripheral channel 284 may be defined in an exterior portion of bit body 222. For example, peripheral channel 284 may be defined radially inward from peripheral side surface 235 of bit body 222. As illustrated in FIG. 10, peripheral channel 284 may extend from an area adjacent at least one cutting element 228 to rearward end 226 of bit body 222. Peripheral channel 284 may be formed to any shape and/or configuration suitable for channeling a fluid, such as a drilling fluid. For example, peripheral channel 284 may comprise a groove extending along a generally helical path between a portion of bit body 222 adjacent cutting element 228 and rearward end 226. Peripheral channel 284 may also comprise any other suitable shape or configuration for drawing a fluid away from forward end 224 and toward rearward end 226, without limitation.

According to various embodiments, a fluid, such as a drilling fluid expelled from forward opening 264 and/or side openings 266, may be directed toward peripheral channel 284. The drilling fluid directed toward peripheral channel 284 may carry cutting debris generated during drilling. In at least one embodiment, a drilling fluid may be directed by at least one opening, such as side opening 266, toward peripheral channel 284 generally in direction 285. For example, as illustrated in FIG. 10, drilling fluid expelled from side opening 266 may be directed across cutting element 228 toward peripheral channel 284 generally in direction 286.

The drilling fluid may then be directed through peripheral channel 284 generally in direction 288. For example, the drilling fluid may be directed in a generally helical path along peripheral channel 284. In some embodiments, the flow of the drilling fluid through peripheral channel 284 may be facilitated as drill bit 220 is rotated in a rotational direction 252. For example, the rotation of drill bit 220 in rotational direction 252 and the force of the water expelled from side ports 266 and/or 264 may cause the drilling fluid to travel through peripheral channel 284 toward rearward end 226 of drill bit 20. In at least one embodiment, travel of the fluid through peripheral channel 284 may be facilitated by gravity as the fluid is gravitationally pulled toward rearward end 226.

Figure 11:
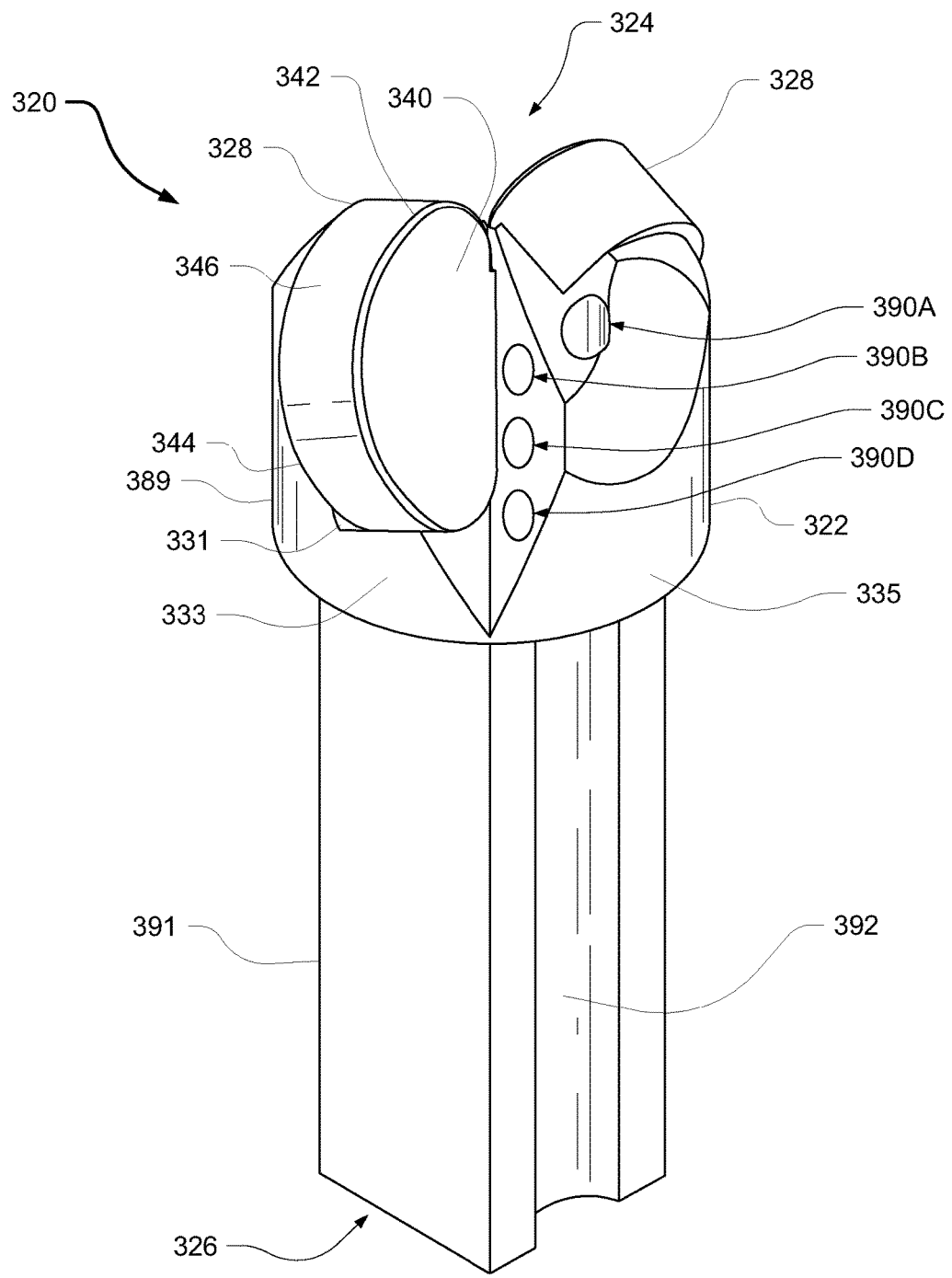
FIG. 11 is a perspective view of an exemplary drill bit according to at least one embodiment.
Figure 12:
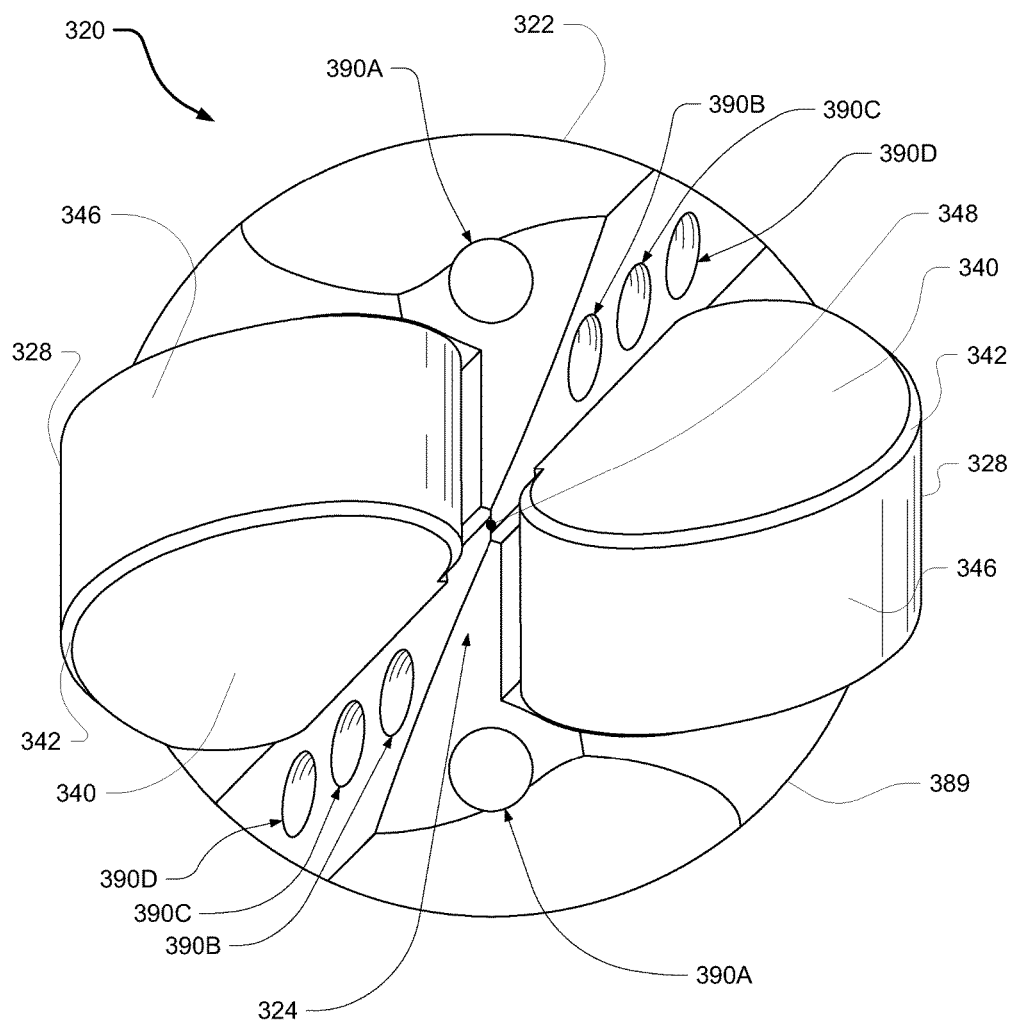
FIG. 12 is top view of the exemplary drill bit illustrated in FIG. 11.

FIGS. 11 and 12 illustrate an exemplary drill bit 320 according to at least one embodiment. FIG. 11 is a perspective view of exemplary drill bit 320 and FIG. 12 is a top view of exemplary drill bit 320. As illustrated in FIG. 11, drill bit 320 may comprise a bit body 322 having a forward end 324 and a rearward end 326. Bit body 322 may comprise a forward drilling portion 389 and a rearward coupling portion 391. Forward drilling portion 389 may have a peripheral side surface 335 defining an outer periphery of drill bit 320. In some examples, peripheral side surface 335 of forward drilling portion 389 may be located radially outward from an outer surface of rearward coupling portion 391. As illustrated in FIG. 12, drill bit 320 may be centered around and/or may be rotatable about a central axis 348. Central axis 348 may extend in a lengthwise direction through drill bit 320 in between forward end 324 and rearward end 326.

At least one cutting element 328 may be mounted and secured to forward drilling portion 389 of bit body 322. Cutting elements 328 may each comprise a cutting face 340, a side surface 346, and a chamfer 342 formed along an intersection between cutting face 340 and side surface 346. Cutting elements 328 may be mounted to bit body 322 so that portions of cutting elements 328 abut support members 333 formed on forward drilling portion 389.

One or more openings may be formed in forward drilling portion 389 of bit body 222. For example, as shown in FIGS. 11 and 12, openings 390A-390D may be defined in forward drilling portion 389. In some embodiments, a drilling fluid (such as drilling mud, air, and/or any other suitable fluid) may be directed through one or more passages (e.g., internal passage 393 illustrated in FIG. 3) to openings 390A-390D. At least one of openings 390A-390D may be located adjacent at least one of cutting elements 328.

Rearward coupling portion 391 of bit body 322 may be shaped and/or configured to couple drill bit 320 to a drilling attachment, such as a reamer, bit seat, drill steel, and/or any other suitable attachment. For example, rearward coupling portion 391 of drill bit 320 may be coupled to a reamer or a bit seat by a threaded connection, a pin connection, a spring connection, and/or any other suitable coupling, without limitation. At least one channel 392 may be defined in rearward coupling portion 391. As illustrated in FIG. 11, channel 392 may extend between rearward end 326 and forward drilling portion 389 of bit body 322. Channel 392 may be sized and configured to direct a fluid, such as air or another suitable drilling fluid, from rearward end 326 toward forward drilling portion 389 of bit body 322. For example, channel 392 may comprise a groove extending between rearward end 326 and forward drilling portion 389 of bit body 322.

Figure 13:
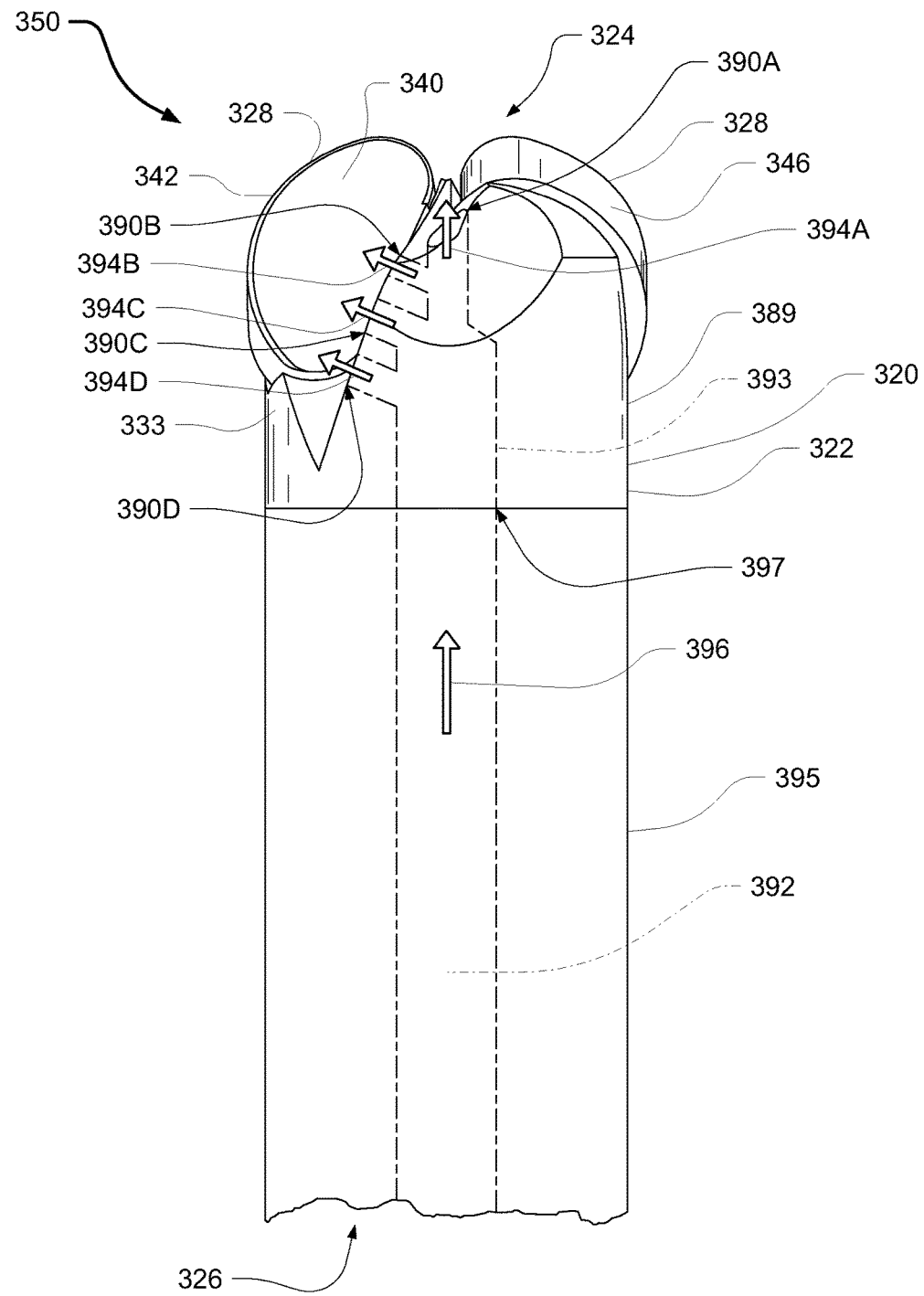
FIG. 13 is a partial perspective view of an exemplary drilling apparatus including the drill bit of FIG. 11 according to at least one embodiment.

FIG. 13 is a side view of a portion of an exemplary drilling apparatus 350 comprising the drill bit 320 illustrated in FIGS. 11 and 12 coupled to a drilling attachment 395 (e.g., a bit seat, a reamer, a drill steel, and/or other suitable drilling attachment). Drilling attachment 395 may be sized and configured to at least partially surround rearward coupling portion 391. Drilling attachment 395 may be coupled to rearward coupling portion 391 using any suitable connection (e.g., a threaded connection, a pin connection, a spring connection, and/or other suitable coupling). Drilling attachment 395 may at least partially surround and/or cover channel 392 defined in rearward coupling portion 391, forming a passage between drilling attachment 395 and rearward coupling portion 391 that extends from rearward end 326 to forward drilling portion 389 of bit body 322.

According to some examples, at least one internal passage 393 may be defined within forward drilling portion 389 of bit body 322. For example, as illustrated in FIG. 13, an internal passage 393 defined within forward drilling portion 389 may extend between an opening 397 defined in a rearward face of forward drilling portion 389 and one or more of openings 390A-390D. In some examples, internal passage 393 may comprise a branched passage having one or more branches extending to openings 390A-390D.

As illustrated in FIG. 13, opening 397 may be located adjacent channel 392 defined in rearward coupling portion 391. Accordingly, drilling fluids may be directed between channel 392 defined in rearward coupling portion 391 and internal passage 393 defined in forward drilling portion 389. In at least one example, drilling apparatus 350 may direct drilling fluids through a passage formed between channel 392 and an internal surface of drilling attachment 395 in general direction 396 (e.g., a generally forward and/or axial direction). The drilling fluids may be directed from channel 392 into internal passage 393 through opening 397 defined in forward drilling portion 389. The drilling fluids may then be forced through openings 390A-390D defined in forward drilling portion 389 in any suitable direction, such as general directions 394A-394D. For example, drilling fluids may be directed through opening 390A in general direction 394A, which is generally parallel to central axis 348 shown in FIG. 12. Drilling fluids may also be directed through openings 390B-390D in general directions 394B-394D, which are not parallel to central axis 348.

A drilling fluid exiting openings 390A-390D may flow over portions of cutting elements 328, such as portions of cutting faces 340 and/or chamfers 342. Additionally, the drilling fluid exiting openings 390A-390D may contact portions of a borehole that is being drilled by drill bit 320. As the drilling fluid contacts portions of the borehole and/or cutting elements 328, the drilling fluid may carry away rock cuttings and/or other debris generated during drilling. The size, shape, number, and/or directional orientation of openings 390A-390D may be selected so as to increase the effectiveness of drill bit 320 in cooling portions of cutting elements 328 and/or to increase the effectiveness of drill bit 320 in removing material from a cutting area near forward end 324 of drill bit 320.

Figure 14:
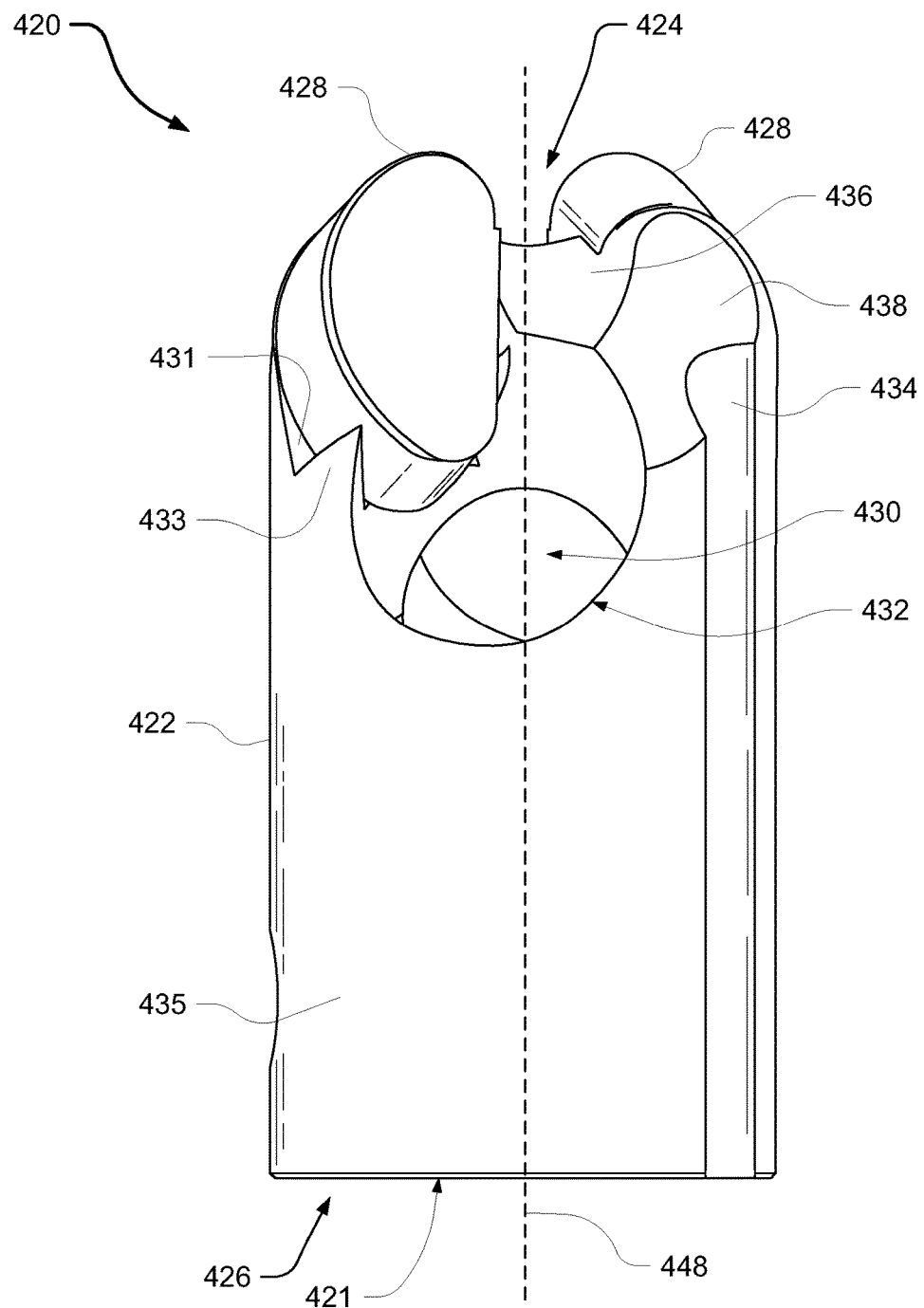
FIG. 14 is a side view of an exemplary drill bit according to at least one embodiment.

FIG. 14 is a side view of an exemplary drill bit 420 according to at least one embodiment. As illustrated in FIG. 14, drill bit 420 may comprise a bit body 422 having a forward end 424 and a rearward end 426. At least one cutting element 428 may be coupled to bit body 422. For example, a plurality of cutting elements 428 may be coupled to forward end 424 of bit body 422. According to some examples, back surfaces of cutting elements 428 may be mounted and secured to mounting surfaces on bit body 422, such as mounting surface 431 shown in FIG. 14. Additionally, each cutting element 428 may be positioned on bit body 422 adjacent to and/or abutting a support member 433. In some examples, bit body 422 may comprise a forward debris path 436 and an inward sloping surface 438.

In at least one embodiment, an internal passage 430 may be defined within bit body 422. As illustrated in FIG. 14, internal passage 430 may extend from a rearward opening 421 defined in rearward end 426 of bit body 422 to at least one side opening 432 defined in a side portion of bit body 422. Bit body 422 may have a peripheral side surface 435 defining an outer periphery of bit body 422. Bit body 422 may also comprise at least one peripheral channel 434 defined in a peripheral portion of bit body 422. Peripheral channel 434 may comprise any suitable shape and configuration. For example, as shown in FIG. 14, peripheral channel 434 may comprise a groove extending along bit body 422 in a generally axial path. Peripheral channel 434 may be configured to direct cutting debris and/or a fluid (e.g., a liquid and/or a gas), such as air and/or drilling fluid, along an outer portion of bit body 422. For example, air may be directed along peripheral channel 434 from rearward end 426 toward forward end 424 of bit body 422 during drilling.

Figure 15:
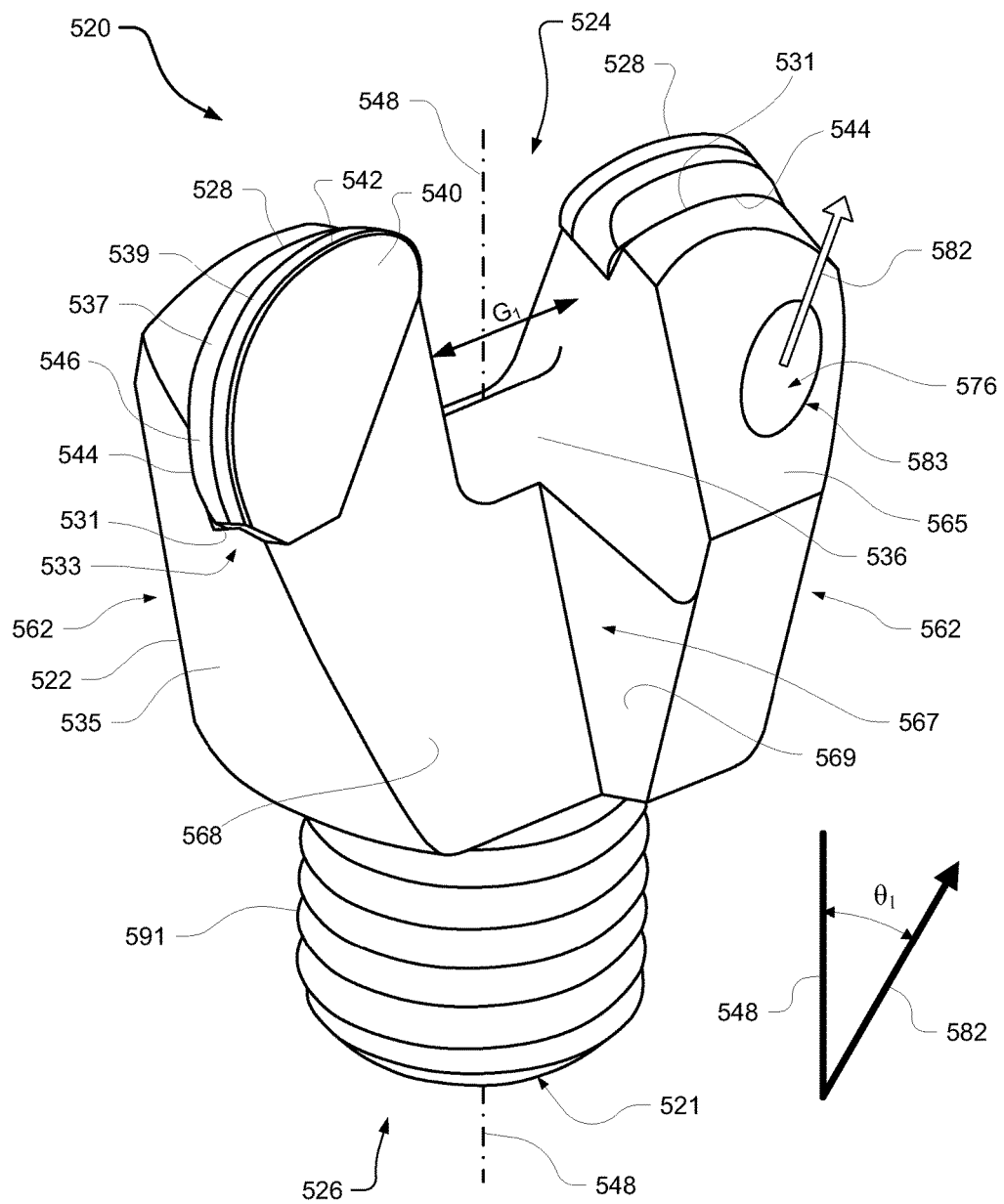
FIG. 15 is a perspective view of an exemplary drill bit according to at least one embodiment.

FIG. 15 shows a perspective view of an exemplary drill bit 520 according to at least one embodiment. Drill bit 520 may represent any type or form of earth-boring or drilling tool, including, for example, a rotary borehole drill bit. Examples of drill bits having cutting elements mounted to a bit body as disclosed herein may be found in U.S. Publication Nos. 2011/0284294, 2012/0043138, and 2012/0279786, the disclosure of each of which is incorporated herein, in its entirety, by this reference. Various shapes, sizes, and configurations of cutting elements and cutter pockets for mounting cutting elements to drill bit 520 may be utilized. Cutting elements may comprise rounded and/or angular peripheral cutting and/or mounting portions. In some embodiments, cutting elements may comprise substantially circular, semicircular, and/or elliptical peripheries. Cutting elements may also comprise various angular and/or substantially planar portions. Cutting elements may be coupled to drill bit 520 using any suitable technique. For example, the cutting elements may be brazed, welded, soldered, threadedly coupled, and/or otherwise adhered and/or fastened to bit body 520. In some embodiments, the cutting elements and/or cutter pockets of drill 520 may include coupling features, such as coupling projections, for securing the cutting elements to drill bit 520 and for preventing movement of the cutting elements within the cutter pockets. Additionally, fastening members may be utilized to secure cutting elements to drill bit 520.

As illustrated in FIG. 15, drill bit 520 may comprise a bit body 522 having a forward end 524 and a rearward end 526. At least one cutting element 528 may be coupled to bit body 522. Bit body 522 may comprise a rearward coupling portion 591 having any configuration suitable for coupling with another attachment (see, e.g., drilling attachment 395 illustrated in FIG. 13). In at least one embodiment, rearward coupling portion 591 may be sized and configured to be at least partially surrounded by a corresponding drilling attachment. A drilling attachment may be coupled to rearward coupling portion 591 using any suitable connection (e.g., a threaded connection, a pin connection, a spring connection, and/or other suitable coupling). A peripheral side surface 535 may define an outer periphery of bit body 522. In some examples, peripheral side surface 535 may be located radially outward from an outer surface of rearward coupling portion 591. As illustrated in FIG. 15, drill bit 520 may be centered around and/or may be rotatable about a central axis 548. Central axis 548 may extend in a lengthwise direction through drill bit 520 between forward end 524 and rearward end 526.

Drill bit 520 may also comprise at least one cutting element support structure 562 extending radially outward and/or offset from a central region of bit body 522. Cutting element support structure 562 may also be referred to as a "bit blade" by those in the art. By way of example, drill bit 520 may include two separate cutting element support structures 562 that are positioned approximately 180° apart (as viewed in a top view) from each other relative to central axis 548. Cutting element support structures 562 may each include a cutter pocket 533 for securing a cutting element 528 to bit body 522 and an upper trailing support surface 565 facing generally opposite cutter pocket 533. Cutter pockets 533 may each include at least one mounting surface, such as back mounting surface 531, for securing cutting element 528 to bit body 522. Cutting element support structures 562 may be spaced apart from each other such that a gap $G_1$ is defined between cutting element support structures 562. As illustrated in FIG. 15, gap $G_1$ may be defined between cutting element support structures 562 at a forward portion of bit body 522 such that gap $G_1$ is located about central axis 548.

Cutting elements 528 may be mounted to bit body 522 so that portions of cutting elements 528 abut cutter pockets 533. Cutting elements 528 may each comprise a layer or table 539 affixed to or formed upon a substrate 537. Table 539 may be formed of any material or combination of materials suitable for cutting subterranean formations, including, for example, a superhard or superabrasive material such as polycrystalline diamond (PCD). Similarly, substrate 537 may comprise any material or combination of materials capable of adequately supporting a superabrasive material during drilling of a subterranean formation, including, for example, cemented tungsten carbide. For example, cutting element 528 may comprise a table 539 comprising polycrystalline diamond bonded to a substrate 537 comprising cobalt-cemented tungsten carbide. In at least one embodiment, after forming table 539, a catalyst material (e.g., cobalt or nickel) may be at least partially removed from table 539 using any suitable technique, such as, for example, acid leaching.

Cutting elements 528 may each comprise a cutting face 540 formed by table 539, a side surface 546 formed by table 539 and substrate 537, and a trailing surface 544 formed by substrate 537. According to various embodiments, cutting face 540 may be substantially planar and side surface 546 may be substantially perpendicular to cutting face 540. Trailing surface 544 may be spaced away from and, in some embodiments, substantially parallel to cutting face 540. Trailing surfaces 544 of cutting elements 528 may be mounted and secured to back mounting surfaces 531 of cutter pockets 533 of cutting element support structures 562, as shown in FIG. 15. Cutting face 540 and side surface 546 may be formed in any suitable shape, without limitation. In one embodiment, cutting face 540 may have a substantially arcuate periphery. In another embodiment, cutting face 540 may have a substantially semi-circular periphery. For example, two cutting elements 528 may be cut from a single substantially circular cutting element blank, resulting in two substantially semi-circular cutting elements 528. In some embodiments, angular portions of side surface 546 may be rounded to form a substantially arcuate surface around cutting element 528. In some embodiments, cutting elements 528 may each include one or more planar portions formed along the periphery cutting element 528.

As illustrated in FIG. 15, each cutting element 528 may also comprise a chamfer 542 formed along at least a portion of a periphery of table 539 between cutting face 540 and side surface 546. Table 539 may also include any other suitable surface shape between cutting face 540 and side surface 546, including, without limitation, an arcuate surface, a sharp edge, and/or a honed edge. Chamfer 542 may be configured to contact and/or cut a subterranean formation as drill bit 520 is rotated relative to the formation. In some embodiments, cutting element 528 may comprise one or more cutting edges formed adjacent to chamfer 542.

Bit body 522 may also comprise at least one central debris feature 536 formed between cutting element support structures 562 at a location rearward of gap $G_1$. Central debris feature 536 may be configured to guide debris, such as rock cuttings, away from a forward region of drill bit 520 that includes cutting elements 528. Central debris feature 536 may be formed in a variety of shapes and sizes, such as the substantially concave shape illustrated in FIG. 15. Additionally, at least one debris channel 567 may be defined in bit body 522 so as to further guide debris away from a forward portion of drill bit 520. For example, debris channel 567 may be configured to guide debris away from central debris feature 536 and cutting elements 528 toward a rearward portion of drill bit 520. Both central debris features 536 and debris channels 567 may be defined radially inward from peripheral side surface 535. Each debris channel 567 may be defined by a plurality of surfaces. For example, debris channel 567 may be defined by a leading channel surface 568 and a second channel surface 569.

According to some embodiments, bit body 522 may also comprise at least one port opening 583. As illustrated in FIG. 15, a port opening 583 may be defined in upper trailing support surface 565 of cutting element support structure 562. Additionally, a rearward opening 521 may be defined in rearward end 526 of bit body 522. According to at least one embodiment, drill bit 520 may be configured such that a drilling fluid may flow through rearward opening 521 to port openings 583. Various internal fluid passages may extend between rearward opening 521 and port openings 583. For example, an internal passage may be defined within bit body 522 such that the internal passage extends from rearward opening 521 to a portion of bit body 522 where one or more passages are defined (see, e.g., internal passage 170 illustrate in FIG. 8).

At least one fluid port 576 may also be defined within bit body 522. In at least one example, fluid ports 576 may be connected with the internal passage extending from rearward opening 521. Each fluid port 576 may be defined within a cutting element support structure 562 between the cutting element 528 mounted to the cutting element support structure 562 and the upper trailing support surface 565 of the cutting element support structure 562 in which port opening 583 is defined. As shown in FIG. 15, fluid directed through fluid port 576 may exit from port opening 583.

According to at least one embodiment, drilling fluid may be directed under pressure through rearward opening 521 toward a forward portion of drill bit 520. Each fluid port 576 is configured to direct fluid from port opening 583 in a generally axially-forward direction 582 with respect to central axis 548. For example, fluid port 576 may be configured to direct a fluid from port opening 583 in direction 582 at an angle $\theta_1$ of from about 0° to about 90° with respect to the forward direction of central axis 548. In some embodiments, fluid port 576 may be configured to direct a fluid from port opening 583 in direction 582 at an angle $\theta_1$ of from about 0° to about 45° with respect to the forward direction of central axis 548. In additional embodiments, fluid port 576 may be configured to direct a fluid from port opening 583 in direction 582 at an angle $\theta_1$ of from about 0° to about 30° with respect to the forward direction of central axis 548. In additional embodiments, fluid port 576 may be configured to direct a fluid from port opening 583 in direction 582 at an angle $\theta_1$ of from about 5° to about 30° with respect to the forward direction of central axis 548. In additional embodiments, fluid port 576 may be configured to direct a fluid from port opening 583 in direction 582 at an angle $\theta_1$ of from about 0° to about 20° with respect to the forward direction of central axis 548. In additional embodiments, fluid port 576 may be configured to direct a fluid from port opening 583 in direction 582 at an angle $\theta_1$ of from about 0° to about 15° with respect to the forward direction of central axis 548. In additional embodiments, fluid port 576 may be configured to direct a fluid from port opening 583 in direction 582 at an angle $\theta_1$ of from about 0° to about 10° with respect to the forward direction of central axis 548.

As illustrated in FIG. 15, each port opening 583 may be disposed rotationally behind (i.e., with respect to the rotation of drill bit 520 during drilling) a cutting element 528 that the port opening 583 is closest to such that port opening 583 is disposed near a trailing surface 544 of cutting element 528. The drilling fluid exiting port openings 583 may be directed against surfaces of a subterranean formation defining a borehole during drilling. For example, drilling fluid may be forced against borehole surfaces that are located forward of drill bit 520 and/or borehole surfaces located adjacent to peripheral side portions of drill bit 520. According to some embodiments, drilling fluid forced against the borehole surfaces may be redirected back over drill bit 520 by the borehole surfaces. The redirected drilling fluid may flow over portions of bit body 522, such as peripheral side surface 535 and central debris features 536, and over portions of cutting elements 528, such as portions of cutting faces 540 and/or chamfers 542. As the drilling fluid contacts portions of the borehole and/or cutting elements 528, the drilling fluid may carry away rock cuttings and/or other debris generated during drilling.

According to at least one embodiment, drilling fluid and debris may be carried away from a borehole and/or cutting elements 528 through gap $G_1$ and central debris features 536 toward debris channels 567. Drilling fluid and debris may also be carried over cutting faces 540 of cutting elements 528 toward debris channels 567, and subsequently toward rearward end 526 of drill bit 520. The size, shape, number, and/or directional orientation of port openings 583 may be selected so as to increase the effectiveness of drill bit 520 in cooling portions of cutting elements 528 and/or to increase the effectiveness of drill bit 520 in removing material from a cutting area near forward end 524 of drill bit 520. Port openings 583, which are defined in upper trailing support surfaces 565 of cutting element support structures 562, are disposed away from central debris features 536 and debris channels 567. Accordingly, debris may be prevented or inhibited from clogging port openings 583, thereby facilitating more consistent delivery of pressurized drilling fluid to a forward portion of drill bit 520 during drilling.

Figure 16:
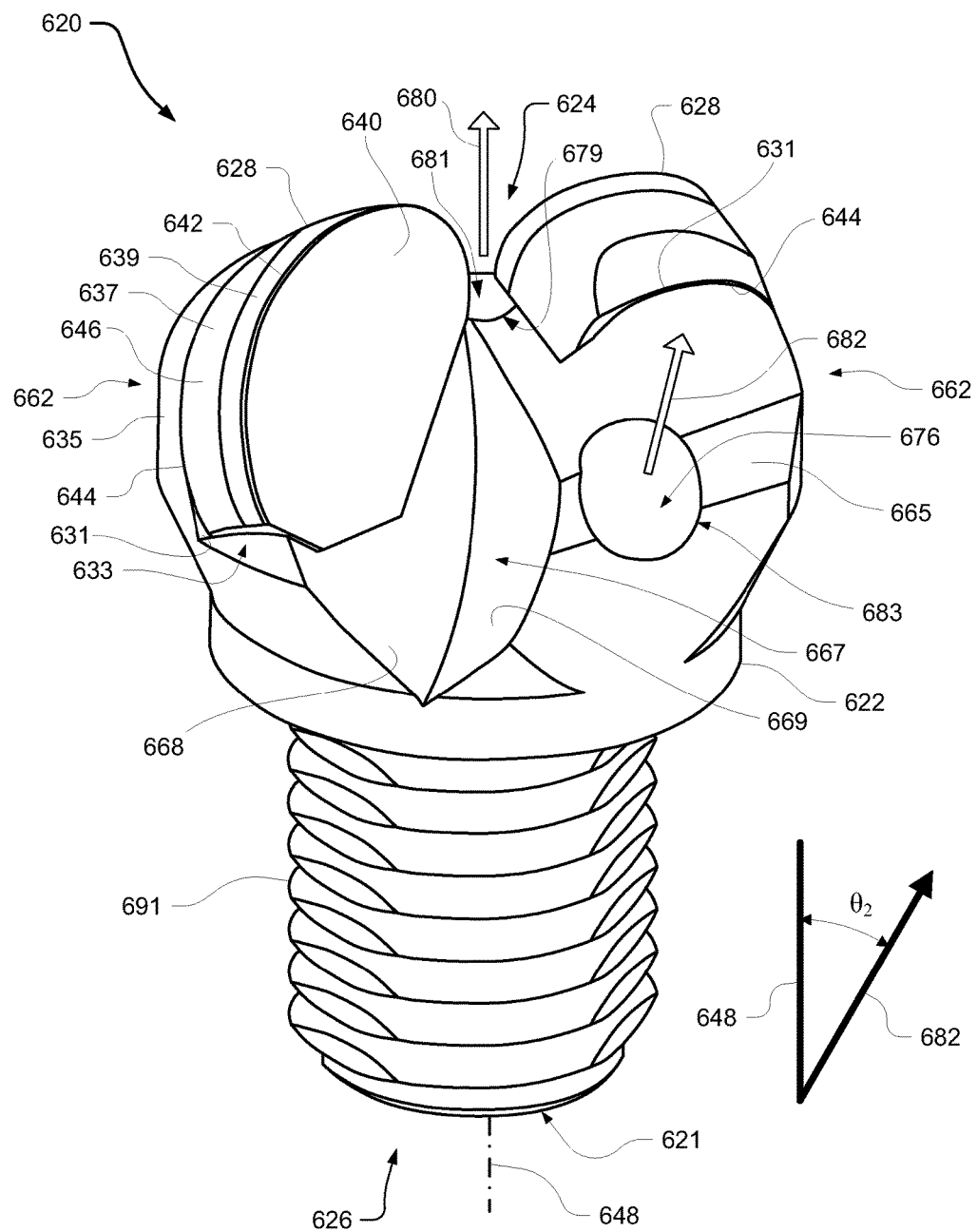
FIG. 16 is a perspective view of an exemplary drill bit according to at least one embodiment.

FIG. 16 shows a perspective view of an exemplary drill bit 620 according to at least one embodiment. Drill bit 620 may represent any type or form of earth-boring or drilling tool, including, for example, a rotary borehole drill bit. In contrast to a coring drill bit that forms a central core of material being drilled during operation, drill bit 620 may be non-coring drill bit. For example, cutting elements 628 of drill bit 620 may form a generally apical cutting tip that cuts a concave borehole without forming a central core within a distal end of a borehole during drilling.

As illustrated in FIG. 16, drill bit 620 may comprise a bit body 622 having a forward end 624 and a rearward end 626. At least one cutting element 628 may be coupled to bit body 622. Bit body 622 may comprise a rearward coupling portion 691 having any configuration suitable for coupling with another attachment (see, e.g., drilling attachment 395 illustrated in FIG. 13). A peripheral side surface 635 may define an outer periphery of bit body 622. In some embodiments, peripheral side surface 635 may be located radially outward from an outer surface of rearward coupling portion 691. As illustrated in FIG. 16, drill bit 620 may be centered around and/or may be rotatable about a central axis 648. Central axis 648 may extend in a lengthwise direction through drill bit 620 between forward end 624 and rearward end 626.

Drill bit 620 may also comprise at least one cutting element support structure 662 extending radially outward and/or offset from a central region of bit body 622. Cutting element support structures 662 may each include a cutter pocket 633 for securing a cutting element 628 to bit body 622 and an upper trailing support surface 665 facing generally opposite cutter pocket 633. Cutter pockets 633 may each include at least one mounting surface, such as back mounting surface 631, for securing cutting element 628 to bit body 622.

Cutting elements 628 may be mounted to bit body 622 so that portions of cutting elements 628 abut cutter pockets 633. Cutting elements 628 may each comprise a layer or table 639 affixed to or formed upon a substrate 637. Table 639 may be formed of any material or combination of materials suitable for cutting subterranean formations, including, for example, a superhard or superabrasive material such as polycrystalline diamond (PCD). Similarly, substrate 637 may comprise any material or combination of materials capable of adequately supporting a superabrasive material during drilling of a subterranean formation, including, for example, cemented tungsten carbide. For example, cutting element 628 may comprise a table 639 comprising polycrystalline diamond bonded to a substrate 637 comprising cobalt-cemented tungsten carbide. In at least one embodiment, after forming table 639, a catalyst material (e.g., cobalt or nickel) may be at least partially removed from table 639 using any suitable technique, such as, for example, acid leaching.

Cutting elements 628 may each comprise a cutting face 640 formed by table 639, a side surface 646 formed by table 639 and substrate 637, and a trailing surface 644 formed by substrate 637. According to various embodiments, cutting face 640 may be substantially planar and side surface 646 may be substantially perpendicular to cutting face 640. Trailing surface 644 may be spaced away from and, in some embodiments, substantially parallel to cutting face 640. Trailing surfaces 644 of cutting elements 628 may be mounted and secured to back mounting surfaces 631 of cutter pockets 633 of cutting element support structures 662, as shown in FIG. 16. Cutting face 640 and side surface 646 may be formed in any suitable shape, without limitation. In one embodiment, cutting face 640 may have a substantially arcuate periphery. In another embodiment, cutting face 640 may have a substantially semi-circular periphery. For example, two cutting elements 628 may be cut from a single substantially circular cutting element blank, resulting in two substantially semi-circular cutting elements 628. In some embodiments, angular portions of side surface 646 may be rounded to form a substantially arcuate surface around cutting element 628. In some embodiments, cutting elements 628 may each include one or more planar portions formed along the periphery cutting element 628.

As illustrated in FIG. 16, each cutting element 628 may also comprise a chamfer 642 formed along at least a portion of a periphery of table 639 between cutting face 640 and side surface 646. Table 639 may also include any other suitable surface shape between cutting face 640 and side surface 646, including, without limitation, an arcuate surface, a sharp edge, and/or a honed edge. Chamfer 642 may be configured to contact and/or cut a subterranean formation as drill bit 620 is rotated relative to the formation. In some embodiments, cutting element 628 may comprise one or more cutting edges formed adjacent to chamfer 642.

Bit body 622 may also comprise at least one debris channel 667 that is defined in bit body 622 so as to guide debris away from a forward portion of drill bit 620. For example, debris channel 667 may be configured to guide debris away from a forward region of bit body 622 and cutting elements 628 toward a rearward portion of drill bit 620. Debris channels 667 may be defined radially inward from peripheral side surface 635. Each debris channel 667 may be defined by a plurality of surfaces. For example, debris channel 667 may be defined by a leading channel surface 668 and a second channel surface 669.

According to some embodiments, bit body 622 may also comprise at least one port opening 683. As illustrated in FIG. 16, a port opening 683 may be defined in upper trailing support surface 665 of cutting element support structure 662. In at least one embodiment, bit body 622 may also comprise at least one forward opening 679. As illustrated in FIG. 16, forward opening 679 may be defined in bit body 622 adjacent to forward end 624 of bit body 622 between cutting element support structures 662. Additionally, a rearward opening 621 may be defined in rearward end 626 of bit body 622. Drill bit 620 may be configured such that a drilling fluid flows through rearward opening 621 to port openings 683 and/or forward opening 679. Various internal fluid passages may extend between rearward opening 621 and port openings 683 and/or forward opening 679. For example, an internal passage may be defined within bit body 622 such that the internal passage extends from rearward opening 621 to a portion of bit body 622 where one or more passages are defined (see, e.g., internal passage 170 illustrate in FIG. 8).

As illustrated in FIG. 16, each port opening 683 may be disposed rotationally behind (i.e., with respect to the rotation of drill bit 620 during drilling) a cutting element 628 that the port opening 683 is closest to such that port opening 683 is disposed near a trailing surface 644 of cutting element 628. At least one fluid port 676 and/or a central passage 681 may also be defined within bit body 622. In at least one example, fluid ports 676 and/or central passage 681 may be connected with the internal passage extending from rearward opening 621. Each fluid port 676 may be defined within a cutting element support structure 662 between the cutting element 628 mounted to the cutting element support structure 662 and the upper trailing support surface 665 of the cutting element support structure 662 in which port opening 683 is defined. Central passage 676 may be defined within a bit body 622 between the cutting element support structures 662. As shown in FIG. 16, fluid directed through fluid port 676 may exit from port opening 683, and fluid directed through central passage 681 may exit from forward opening 679.

According to at least one embodiment, drilling fluid may be directed under pressure through rearward opening 621 toward a forward portion of drill bit 620. Each fluid port 676 is configured to direct fluid from port opening 683 in a generally axially-forward direction 682 with respect to central axis 648. For example, fluid port 676 may be configured to direct a fluid from port opening 683 in direction 682 at an angle $\theta_2$ of from about 0° to about 90° with respect to the forward direction of central axis 648. In some embodiments, fluid port 676 may be configured to direct a fluid from port opening 683 in direction 682 at an angle $\theta_2$ of from about 0° to about 45° with respect to the forward direction of central axis 648. In additional embodiments, fluid port 676 may be configured to direct a fluid from port opening 683 in direction 682 at an angle $\theta_2$ of from about 0° to about 30° with respect to the forward direction of central axis 648. In additional embodiments, fluid port 676 may be configured to direct a fluid from port opening 683 in direction 682 at an angle $\theta_2$ of from about 5° to about 30° with respect to the forward direction of central axis 648. In additional embodiments, fluid port 676 may be configured to direct a fluid from port opening 683 in direction 682 at an angle $\theta_2$ of from about 0° to about 20° with respect to the forward direction of central axis 648. In additional embodiments, fluid port 676 may be configured to direct a fluid from port opening 683 in direction 682 at an angle $\theta_2$ of from about 0° to about 15° with respect to the forward direction of central axis 648. In additional embodiments, fluid port 676 may be configured to direct a fluid from port opening 683 in direction 682 at an angle $\theta_2$ of from about 0° to about 10° with respect to the forward direction of central axis 648.

The drilling fluid exiting port openings 683 may be directed against surfaces of a subterranean formation defining a borehole during drilling. For example, drilling fluid may be forced against borehole surfaces located forward of drill bit 620 and/or borehole surfaces located adjacent to peripheral side portions of drill bit 620. According to some embodiments, drilling fluid forced against the borehole surfaces may be redirected back over drill bit 620 by the borehole surfaces. The redirected drilling fluid may flow over portions of bit body 622, such as peripheral side surface 635, and over portions of cutting elements 628, such as portions of cutting faces 640 and/or chamfers 642. As the drilling fluid contacts portions of the borehole and/or cutting elements 628, the drilling fluid may carry away rock cuttings and/or other debris generated during drilling.

According to at least one embodiment, drilling fluid and debris may be carried away from a borehole and/or cutting elements 628 through debris channels 667. Drilling fluid and debris may also be carried over cutting faces 640 of cutting elements 628 toward debris channels 667, and subsequently toward rearward end 626 of drill bit 620. The size, shape, number, and/or directional orientation of port openings 683 may be selected so as to increase the effectiveness of drill bit 620 in cooling portions of cutting elements 628 and/or to increase the effectiveness of drill bit 620 in removing material from a cutting area near forward end 624 of drill bit 620. Port openings 683, which are defined in upper trailing support surfaces 665 of cutting element support structures 662, are disposed away from debris channels 667. Accordingly, debris may be prevented or inhibited from clogging port openings 683, thereby facilitating more consistent delivery of pressurized drilling fluid to a forward portion of drill bit 620 during drilling.

Accordingly to various embodiments, a selected volume of drilling fluid may pass through central passage 681 when central passage 681 is unobstructed. However, central passage 681 may become at least partially blocked by cutting debris during drilling. For example, cutting debris, such as a rock chip separated from a rock formation being drilled, may become lodged within at least a portion of forward opening 679 and/or central passage 681, limiting the flow of drilling fluid through central passage 681. If central passage 681 becomes blocked by debris, the fluid pressure in bit body 622 may be increased and a greater volume of drilling fluid may be forced through fluid ports 676 in a selected direction (i.e., angle with respect to the forward direction of central axis 648). The drilling fluid exiting port openings 683 may be redirected within a borehole being drilled so as to facilitate removal of debris clogging central passage 681 and/or forward opening 679.

Figure 17:
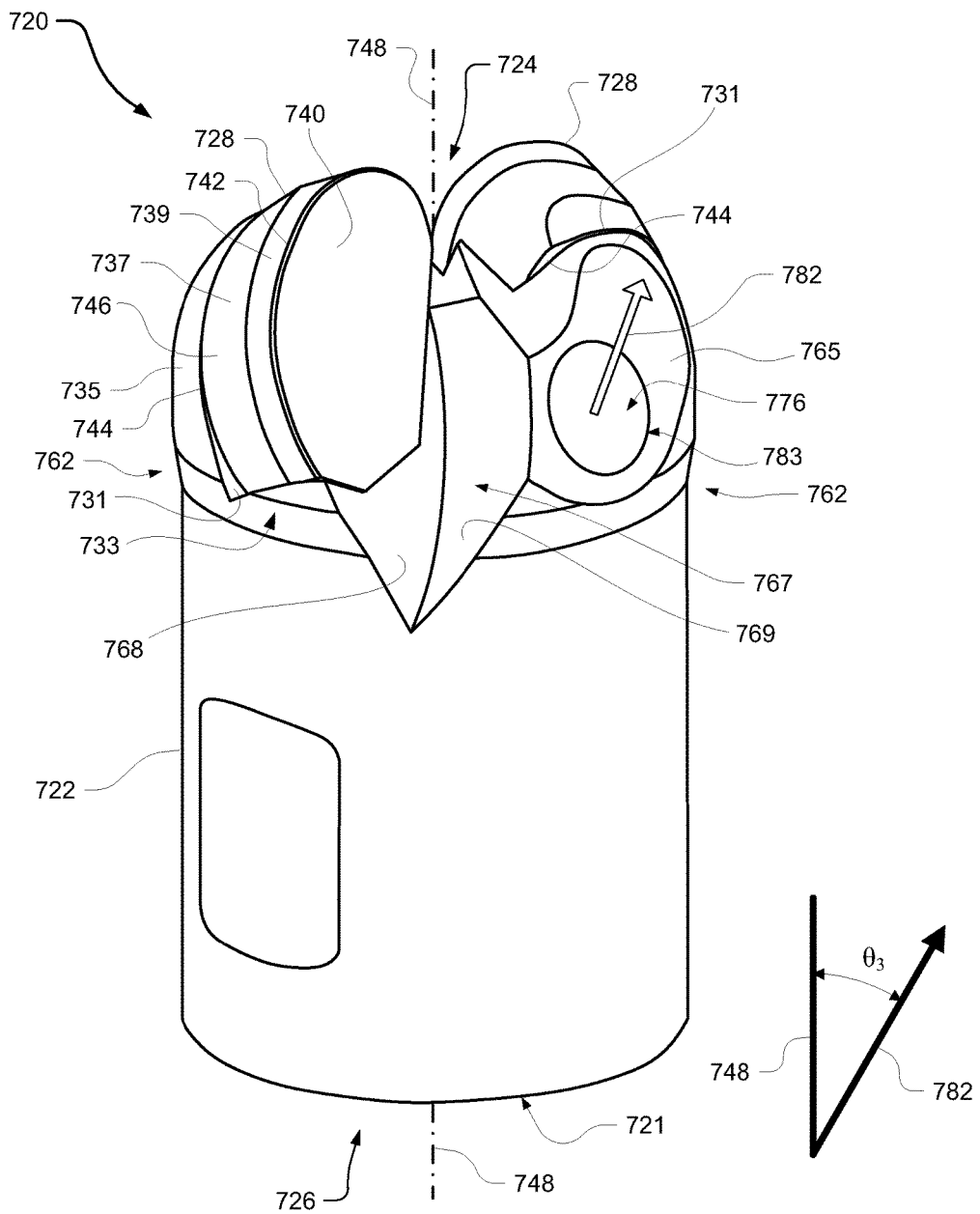
FIG. 17 is a perspective view of an exemplary drill bit according to at least one embodiment.

FIG. 17 shows a perspective view of an exemplary drill bit 720 according to at least one embodiment. Drill bit 720 may represent any type or form of earth-boring or drilling tool, including, for example, a rotary borehole drill bit.

As illustrated in FIG. 17, drill bit 720 may comprise a bit body 722 having a forward end 724 and a rearward end 726. At least one cutting element 728 may be coupled to bit body 722. Bit body 722 may have a peripheral side surface 735 defining an outer periphery of bit body 722. As illustrated in FIG. 17, drill bit 720 may be non-coring (i.e., may not generate a central core of material being drilled during operation) and may be centered around and/or may be rotatable about a central axis 748. Central axis 748 may extend in a lengthwise direction through drill bit 720 between forward end 724 and rearward end 726.

Drill bit 720 may also comprise a main body 760 and at least one cutting element support structure 762 extending radially outward and/or offset from main body 760. An internal coupling portion may be defined in a rearward portion of bit body 722 and may be shaped and/or configured to couple drill bit 720 to a drilling attachment, such as a reamer, bit seat, drill steel, and/or any other suitable attachment. Cutting element support structures 762 may each include a cutter pocket 733 for securing a cutting element 728 to bit body 722 and an upper trailing support surface 765 facing generally opposite cutter pocket 733. Cutter pockets 733 may each include at least one mounting surface, such as back mounting surface 731, for securing cutting element 728 to bit body 722.

Cutting elements 728 may be mounted to bit body 722 so that portions of cutting elements 728 abut cutter pockets 733. Cutting elements 728 may each comprise a layer or table 739 affixed to or formed upon a substrate 737. Table 739 may be formed of any material or combination of materials suitable for cutting subterranean formations, including, for example, a superhard or superabrasive material such as polycrystalline diamond (PCD). Similarly, substrate 737 may comprise any material or combination of materials capable of adequately supporting a superabrasive material during drilling of a subterranean formation, including, for example, cemented tungsten carbide. For example, cutting element 728 may comprise a table 739 comprising polycrystalline diamond bonded to a substrate 737 comprising cobalt-cemented tungsten carbide. In at least one embodiment, after forming table 739, a catalyst material (e.g., cobalt or nickel) may be at least partially removed from table 739 using any suitable technique, such as, for example, acid leaching.

Cutting elements 728 may each comprise a cutting face 740 formed by table 739, a side surface 746 formed by table 739 and substrate 737, and a trailing surface 744 formed by substrate 737. According to various embodiments, cutting face 740 may be substantially planar and side surface 746 may be substantially perpendicular to cutting face 740. Trailing surface 744 may be spaced away from and, in some embodiments, substantially parallel to cutting face 740. Trailing surfaces 744 of cutting elements 728 may be mounted and secured to back mounting surfaces 731 of cutter pockets 733 of cutting element support structures 762, as shown in FIG. 17. Cutting face 740 and side surface 746 may be formed in any suitable shape, without limitation. In one embodiment, cutting face 740 may have a substantially arcuate periphery. In another embodiment, cutting face 740 may have a substantially semi-circular periphery. For example, two cutting elements 728 may be cut from a single substantially circular cutting element blank, resulting in two substantially semi-circular cutting elements 728. In some embodiments, angular portions of side surface 746 may be rounded to form a substantially arcuate surface around cutting element 728. In some embodiments, cutting elements 728 may each include one or more planar portions formed along the periphery cutting element 728.

As illustrated in FIG. 17, each cutting element 728 may also comprise a chamfer 742 formed along at least a portion of a periphery of table 739 between cutting face 740 and side surface 746. Table 739 may also include any other suitable surface shape between cutting face 740 and side surface 746, including, without limitation, an arcuate surface, a sharp edge, and/or a honed edge. Chamfer 742 may be configured to contact and/or cut a subterranean formation as drill bit 720 is rotated relative to the formation. In some embodiments, cutting element 728 may comprise one or more cutting edges formed adjacent to chamfer 742.

Bit body 722 may also comprise at least one debris channel 767 that is defined in bit body 722 so as to guide debris away from a forward portion of drill bit 720. For example, debris channel 767 may be configured to guide debris away from a forward region of bit body 722 and cutting elements 728 toward a rearward portion of drill bit 720. Debris channels 767 may be defined radially inward from peripheral side surface 735. Each debris channel 767 may be defined by a plurality of surfaces. For example, debris channel 767 may be defined by a leading channel surface 768 and a second channel surface 769.

According to some embodiments, bit body 722 may also comprise at least one port opening 783. As illustrated in FIG. 17, a port opening 783 may be defined in upper trailing support surface 765 of cutting element support structure 762. Additionally, a rearward opening 721 may be defined in rearward end 726 of bit body 722. According to at least one embodiment, drill bit 720 may be configured such that a drilling fluid may flow through rearward opening 721 to port openings 783. Various internal fluid passages may extend between rearward opening 721 and port openings 783. For example, an internal passage may be defined within bit body 722 such that the internal passage extends from rearward opening 721 to a portion of bit body 722 where one or more passages are defined (see, e.g., internal passage 170 illustrate in FIG. 8).

As illustrated in FIG. 17, each port opening 783 may be disposed rotationally behind (i.e., with respect to the rotation of drill bit 720 during drilling) a cutting element 728 that the port opening 783 is closest to such that port opening 783 is disposed near a trailing surface 744 of cutting element 728. At least one fluid port 776 may also be defined within bit body 722. In at least one example, fluid ports 776 may be connected with the internal passage extending from rearward opening 721. Each fluid port 776 may be defined within a cutting element support structure 762 between the cutting element 728 mounted to the cutting element support structure 762 and the upper trailing support surface 765 of the cutting element support structure 762 in which a port opening 783 is defined. As shown in FIG. 17, fluid directed through fluid port 776 may exit from port opening 783.

According to at least one embodiment, drilling fluid may be directed under pressure through rearward opening 721 toward a forward portion of drill bit 720. Each fluid port 776 is configured to direct fluid from port opening 783 in a generally axially-forward direction 782 with respect to the forward direction of central axis 748. For example, fluid port 776 may be configured to direct a fluid from port opening 783 in direction 782 at an angle $\theta_3$ of from about 0° to about 90° with respect to the forward direction of central axis 748. In some embodiments, fluid port 776 may be configured to direct a fluid from port opening 783 in direction 782 at an angle $\theta_3$ of from about 0° to about 45° with respect to the forward direction of central axis 748. In additional embodiments, fluid port 776 may be configured to direct a fluid from port opening 783 in direction 782 at an angle $\theta_3$ of from about 0° to about 30° with respect to the forward direction of central axis 748. In additional embodiments, fluid port 776 may be configured to direct a fluid from port opening 783 in direction 782 at an angle $\theta_3$ of from about 5° to about 30° with respect to the forward direction of central axis 748. In additional embodiments, fluid port 776 may be configured to direct a fluid from port opening 783 in direction 782 at an angle $\theta_3$ of from about 0° to about 20° with respect to the forward direction of central axis 748. In additional embodiments, fluid port 776 may be configured to direct a fluid from port opening 783 in direction 782 at an angle $\theta_3$ of from about 0° to about 15° with respect to the forward direction of central axis 748. In additional embodiments, fluid port 776 may be configured to direct a fluid from port opening 783 in direction 782 at an angle $\theta_3$ of from about 0° to about 10° with respect to the forward direction of central axis 748.

The drilling fluid exiting port openings 783 may be directed against surfaces of a subterranean formation defining a borehole during drilling. For example, drilling fluid may be forced against borehole surfaces located forward of drill bit 720 and/or borehole surfaces located adjacent to peripheral side portions of drill bit 720. According to some embodiments, drilling fluid forced against the borehole surfaces may be redirected back over drill bit 720 by the borehole surfaces. The redirected drilling fluid may flow over portions of bit body 722, such as peripheral side surface 735, and over portions of cutting elements 728, such as portions of cutting faces 740 and/or chamfers 742. As the drilling fluid contacts portions of the borehole and/or cutting elements 728, the drilling fluid may carry away rock cuttings and/or other debris generated during drilling.

According to at least one embodiment, drilling fluid and debris may be carried away from a borehole and/or cutting elements 728 through debris channels 767. Drilling fluid and debris may also be carried over cutting faces 740 of cutting elements 728 toward debris channels 767, and subsequently toward rearward end 726 of drill bit 720. The size, shape, number, and/or directional orientation of port openings 783 may be selected so as to increase the effectiveness of drill bit 720 in cooling portions of cutting elements 728 and/or to increase the effectiveness of drill bit 720 in removing material from a cutting area near forward end 724 of drill bit 720. Port openings 783, which are defined in upper trailing support surfaces 765 of cutting element support structures 762, are disposed away from debris channels 767. Accordingly, debris may be prevented or inhibited from clogging port openings 783, thereby enabling more consistent delivery of pressurized drilling fluid to a forward portion of drill bit 720 during drilling.

The preceding description has been provided to enable others skilled the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for manufacturing a roof-bolt drill bit, the method comprising:
    providing a bit body rotatable about a rotational axis, the rotational axis extending between a forward end and a rearward end of the bit body, the bit body comprising at least two cutting element support structures, each of the at least two cutting element support structures comprising:
        a mounting surface for mounting a cutting element to the bit body;
        a trailing support surface;
    forming an internal passage within the bit body, the internal passage extending from a rearward opening defined in the rearward end of the bit body through at least a portion of the bit body;
    forming a fluid port within each of the at least two cutting element support structures, each fluid port extending from the internal passage to a port opening defined in the corresponding cutting element support structure, each port opening being positioned adjacent to the mounting surface of the corresponding cutting element support structure;
    brazing the at least two cutting elements to the bit body, each of the at least two cutting elements comprising polycrystalline diamond.

2. The method of claim 1, wherein an alignment direction of each of the fluid ports forms an angle with respect to a forward direction of the central axis.

3. The method of claim 2, wherein the angle is between about 5° and about 30°.

4. The method of claim 2, wherein each of the fluid ports is angled away from the mounting surface of the corresponding cutting element support structure.

5. The method of claim 1, wherein each of the port openings is defined in the trailing support surface of the corresponding cutting element support structure.

6. The method of claim 1, further comprising forming a central passage within the bit body, the central passage extending from the internal passage to a forward opening defined in a forward portion of the bit body.

7. The method of claim 1, wherein each of the at least two cutting elements comprises:
    a cutting face;
    a cutting edge adjacent to the cutting face;
    a trailing surface spaced away from the cutting face, the trailing surface of the cutting element being fixed to the mounting surface of the corresponding cutting element support structure by the brazing.

8. The method of claim 1, wherein each of the at least two cutting elements further comprises a substrate bonded to the polycrystalline diamond.

9. The method of claim 1, further comprising forming a debris channel in the bit body, the debris channel being configured to direct debris away from the at least two cutting element support structures.

10. The method of claim 9, wherein at least a portion of the debris channel is defined between the at least two cutting element support structures.

11. A method for manufacturing a roof-bolt drill bit, the method comprising:
    providing a bit body rotatable about a rotational axis, the rotational axis extending between a forward end and a rearward end of the bit body, the bit body comprising at least two cutting element support structures, each of the at least two cutting element support structures comprising a back mounting surface for mounting a cutting element to the bit body;
    forming an internal passage within the bit body, the internal passage extending from a rearward opening defined in the rearward end of the bit body through at least a portion of the bit body;
    forming a fluid port within each of the at least two cutting element support structures, each fluid port being defined rotationally trailing the back mounting surface of the corresponding cutting element support structure, each fluid port extending from the internal passage to a port opening defined in the corresponding cutting element support structure;
    brazing the at least two cutting elements to the bit body, each of the at least two cutting elements comprising polycrystalline diamond.

12. The method of claim 11, wherein an alignment direction of each of the fluid ports forms an angle with respect to a forward direction of the central axis that is between about 0° and about 45°.

13. The method of claim 12, wherein the angle is between about 5° and about 30°.

14. The method of claim 11, wherein each of the fluid ports is configured to direct fluid away from the back mounting surface of the corresponding cutting element support structure.

15. The method of claim 11, wherein each of the at least two cutting elements comprises:
    a cutting face;
    a cutting edge adjacent to the cutting face;
    a trailing surface spaced away from the cutting face, the trailing surface of the cutting element being fixed to the back mounting surface of the corresponding cutting element support structure by the brazing.

16. A method for manufacturing a roof-bolt drill bit, the method comprising:
    providing a bit body rotatable about a rotational axis, the rotational axis extending between a forward end and a rearward end of the bit body, the bit body comprising at least two cutting element support structures, each of the at least two cutting element support structures comprising:
        a mounting surface for mounting a cutting element to the bit body;
        a trailing support surface;
    forming an internal passage within the bit body, the internal passage extending from a rearward opening defined in the rearward end of the bit body through at least a portion of the bit body;
    forming a fluid port within each of the at least two cutting element support structures, each fluid port extending from the internal passage to a port opening defined in the corresponding cutting element support structure, each port opening being positioned adjacent to the mounting surface of the corresponding cutting element support structure;
    brazing the at least two cutting elements to the bit body, each of the at least two cutting elements comprising polycrystalline diamond;
    wherein a gap is defined between the at least two cutting element support structures.

17. The method of claim 16, wherein the gap is defined about the central axis.

18. The method of claim 16, wherein the gap comprises a space extending radially through the bit body.

19. The method of claim 16, wherein each of the at least two cutting elements comprises:
   a cutting face;
   a cutting edge adjacent to the cutting face;
   a trailing surface spaced away from the cutting face, the trailing surface of the cutting element being fixed to the mounting surface of the corresponding cutting element support structure by the brazing.

* * * * *